United States Patent
Deng et al.

(10) Patent No.: US 9,497,485 B2
(45) Date of Patent: Nov. 15, 2016

(54) CODING UNIT SIZE DEPENDENT SIMPLIFIED DEPTH CODING FOR 3D VIDEO CODING

(71) Applicant: Intel Corporation, Santa Clara, CA (US)

(72) Inventors: Zhipin Deng, Beijing (CN); Yi-Jen Chiu, San Jose, CA (US); Lidong Xu, Beijing (CN); Wenhao Zhang, Beijing (CN); Yu Han, Beijing (CN); Xiaoxia Cai, Beijing (CN)

(73) Assignee: Intel Corporation, Santa Clara, CA (US)

( * ) Notice: Subject to any disclaimer, the term of this patent is extended or adjusted under 35 U.S.C. 154(b) by 352 days.

(21) Appl. No.: 14/129,231

(22) PCT Filed: Aug. 21, 2013

(86) PCT No.: PCT/US2013/055920
§ 371 (c)(1),
(2) Date: Dec. 24, 2013

(87) PCT Pub. No.: WO2014/168643
PCT Pub. Date: Oct. 16, 2014

(65) Prior Publication Data
US 2015/0003512 A1    Jan. 1, 2015

Related U.S. Application Data

(60) Provisional application No. 61/811,214, filed on Apr. 12, 2013, provisional application No. 61/811,257, filed on Apr. 12, 2013.

(51) Int. Cl.
*H04N 19/103* (2014.01)
*H04N 19/597* (2014.01)
*H04N 19/109* (2014.01)
(Continued)

(52) U.S. Cl.
CPC ........ *H04N 19/597* (2014.11); *H04N 13/0048* (2013.01); *H04N 13/0271* (2013.01); *H04N 19/103* (2014.11); *H04N 19/105* (2014.11); *H04N 19/109* (2014.11); *H04N 19/11* (2014.11);
(Continued)

(58) Field of Classification Search
CPC ..................... H04N 13/0048; H04N 13/0271; H04N 19/103; H04N 19/109; H04N 19/11
See application file for complete search history.

(56) References Cited

U.S. PATENT DOCUMENTS

2011/0038414 A1   2/2011  Song et al.
2012/0008676 A1   1/2012  Lee et al.
(Continued)

FOREIGN PATENT DOCUMENTS

EP       2924995 A1       9/2015
KR       20110018188      2/2001
(Continued)

OTHER PUBLICATIONS

International Report on Patentability for PCT/US2013/055920, mailed Oct. 22, 2015, 6 pages.
(Continued)

*Primary Examiner* — Robert Hance
(74) *Attorney, Agent, or Firm* — Green, Howard & Mughal LLP

(57) ABSTRACT

Systems, articles, and methods for coding unit size dependent simplified depth coding for 3D video coding.

20 Claims, 12 Drawing Sheets

(51) Int. Cl.

| | |
|---|---|
| *H04N 13/02* | (2006.01) |
| *H04N 13/00* | (2006.01) |
| *H04N 19/11* | (2014.01) |
| *H04N 19/105* | (2014.01) |
| *H04N 19/159* | (2014.01) |
| *H04N 19/176* | (2014.01) |
| *H04N 19/187* | (2014.01) |

(52) U.S. Cl.
CPC .......... *H04N 19/159* (2014.11); *H04N 19/176* (2014.11); *H04N 19/187* (2014.11)

(56) References Cited

U.S. PATENT DOCUMENTS

| | | | |
|---|---|---|---|
| 2012/0093226 A1 | 4/2012 | Chien et al. | |
| 2012/0229602 A1 | 9/2012 | Chen et al. | |
| 2013/0022111 A1 | 1/2013 | Chen et al. | |
| 2014/0198179 A1* | 7/2014 | Gu ................... | H04N 19/00769 348/43 |
| 2014/0253682 A1* | 9/2014 | Zhang ................ | H04N 13/0048 348/43 |
| 2015/0350677 A1* | 12/2015 | Lim .................... | H04N 19/463 375/240.12 |

FOREIGN PATENT DOCUMENTS

| | | |
|---|---|---|
| KR | 10-2011-0036401 A | 4/2011 |
| KR | 20120005932 | 1/2012 |
| KR | 10-2012-0034042 A | 4/2012 |
| KR | 10-2013-0002297 A | 1/2013 |
| WO | 2013/032423 A1 | 3/2013 |

OTHER PUBLICATIONS

Jager, Fabian, "Simplified Depth Map Intra Coding With an Optional Depth Lookup Table", In: 2012 International Conference on 3D Imaging (IC3D), Dec. 3-5, 2012, 5 pages.

Schwarz, et al.,"Test Model Under Consideration for HEVC Based 3D Video Coding", ISO/IEC JTC1/SC29/WG11MPEG2011/ N12559, Feb. 2012, 45 pages.

International Search Report and Written Opinion received for PCT Patent Application No. PCT/US2013/055920, mailed on Jan. 16, 2014, 9 pages.

Deng et al., "3D-CE6-related: Cleanup for 64×64 SDC," Joint Collaborative Team on 3D Video Coding Extensions of ITU-T SG 16 WP 3 and ISO/IEC JTC 1/SC 29/WG 11, Apr. 2013, 6 pages.

Jager et al., "Model-Based Intra Coding for Depth Maps in 3D Video Using a Depth Lookup Table," 3DTV-Conference: The True Vision—Capture, Transmission and Display of 3D Video (3DTV-CON), Oct. 2012 , 4 pages.

International Search Report and Written Opinion for PCT/US2013/055919, mailed Jan. 16, 2014, 11 pages.

International Report on Patentability for PCT/US2013/055919, mailed Oct. 22, 2015, 7 pages.

Translation of Office Action for Korean Patent Application No. 2015-7024855, issued on Apr. 19, 2016.

Jager, Fabian, "Simplified depth map intra coding with an optional depth lookup table", 2012 International Conference on 3D Imaging (IC3D), Dec. 3-5, 2012, 4 pages.

Oh, Byung Tae et al., "3D-CE6.h related results on Improved Simple Depth Coding", Joint Collaborative Team on 3D Video Coding Extension Development of ITU-T SG 16 WP 3 and ISO/IEC JTC 1/SC 29/WG 11, 3rd Meeting: Geneva, CH Jan. 17-23, 2013, 4 pages.

* cited by examiner

CODING UNIT SIZE DEPENDENT SIMPLIFIED DEPTH CODING FOR 3D VIDEO CODING

CROSS-REFERENCE TO RELATED APPLICATIONS

This application claims the benefit of U.S. Provisional Application No. 61/811,257, filed Apr. 12, 2013, and the benefit of U.S. Provisional Application No. 61/811,214, filed Apr. 12, 2013, both of which are incorporated herein for all purposes.

BACKGROUND

A video encoder compresses video information so that more information can be sent over a given bandwidth. The compressed signal may then be transmitted to a receiver having a decoder that decodes or decompresses the signal prior to display.

High Efficient Video Coding (HEVC) is a video compression standard, which is being developed by the Joint Collaborative Team on Video Coding (JCT-VC) formed by ISO/IEC Moving Picture Experts Group (MPEG) and ITU-T Video Coding Experts Group (VCEG). Similar to previous video coding standards, HEVC includes basic functional modules such as intra/inter prediction, transform, quantization, in-loop filtering, and entropy coding. HEVC codec processes and compresses a picture by partitioning it into multiple non-overlapped blocks, which are denoted as coding units (CUs). A coding unit contains a square block of luma pixels and two corresponding blocks of chroma pixels. The size of the coding unit can be configured to be 8×8, 16×16, 32×32 or 64×64 in luma component.

Based on the HEVC standard, the study of Three Dimensional Video Coding extension of HEVC (3D-HEVC) is currently on-going by the Joint Collaborative Team on 3D Video Coding (JCT-3V) formed by ISO/IEC Moving Picture Experts Group (MPEG) and ITU-T Video Coding Experts Group (VCEG). In 3D-HEVC, Multiview Video plus Depth (MVD) concept is used to represent the 3D video content, in which a limited number of texture views and associated depth maps are coded and multiplexed into a bitstream.

BRIEF DESCRIPTION OF THE DRAWINGS

The material described herein is illustrated by way of example and not by way of limitation in the accompanying figures. For simplicity and clarity of illustration, elements illustrated in the figures are not necessarily drawn to scale. For example, the dimensions of some elements may be exaggerated relative to other elements for clarity. Further, where considered appropriate, reference labels have been repeated among the figures to indicate corresponding or analogous elements. In the figures.

DETAILED DESCRIPTION

Figure 1:
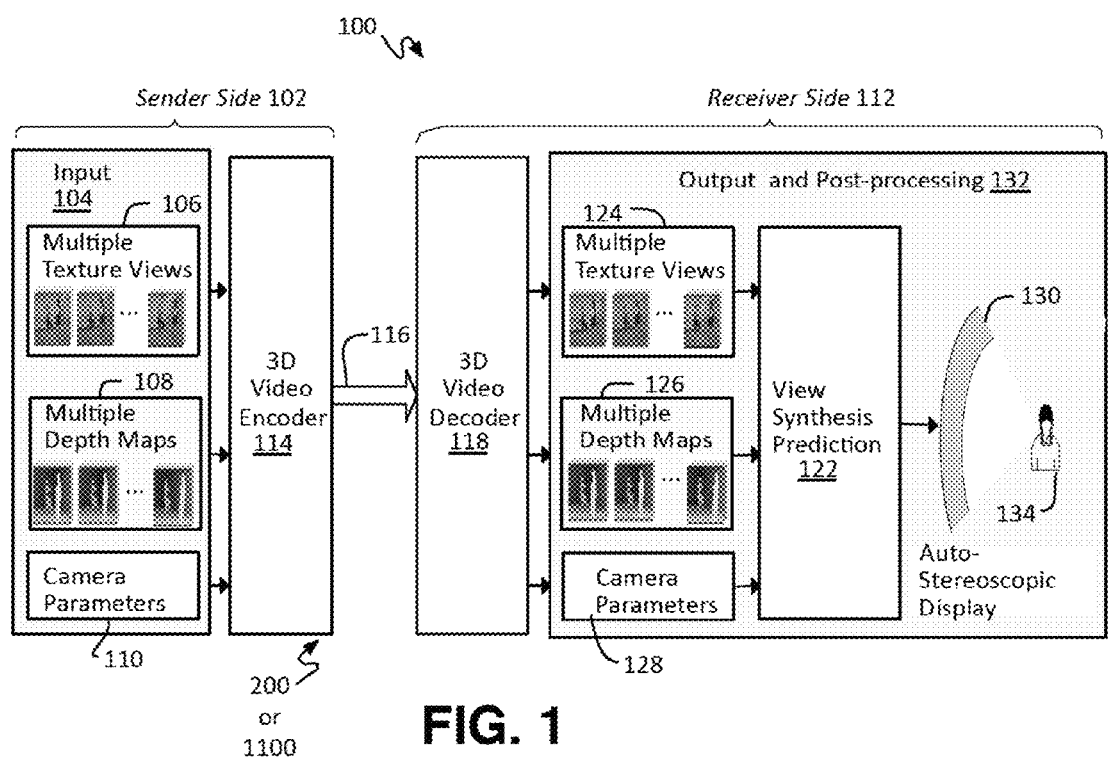
FIG. 1 is an illustrative diagram of a 3D video content system.

One or more implementations are now described with reference to the enclosed figures. While specific configurations and arrangements are discussed, it should be understood that this is done for illustrative purposes only. Persons skilled in the relevant art will recognize that other configurations and arrangements may be employed without departing from the spirit and scope of the description. It will be apparent to those skilled in the relevant art that techniques and/or arrangements described herein may also be employed in a variety of other systems and applications other than what is described herein.

While the following description sets forth various implementations that may be manifested in architectures such as system-on-a-chip (SoC) architectures for example, implementation of the techniques and/or arrangements described herein are not restricted to particular architectures and/or computing systems and may be implemented by any architecture and/or computing system for similar purposes. For instance, various architectures employing, for example, multiple integrated circuit (IC) chips and/or packages, and/or various computing devices and/or consumer electronic (CE) devices such as set top boxes, smart phones, etc., may implement the techniques and/or arrangements described herein. Further, while the following description may set forth numerous specific details such as logic implementations, types and interrelationships of system components, logic partitioning/integration choices, etc., claimed subject matter may be practiced without such specific details. In other instances, some material such as, for example, control structures and full software instruction sequences, may not be shown in detail in order not to obscure the material disclosed herein.

The material disclosed herein may be implemented in hardware, firmware, software, or any combination thereof. The material disclosed herein may also be implemented as instructions stored on a machine-readable medium, which may be read and executed by one or more processors. A machine-readable medium may include any medium and/or mechanism for storing or transmitting information in a form readable by a machine (e.g., a computing device). For example, a machine-readable medium may include read only memory (ROM); random access memory (RAM); magnetic disk storage media; optical storage media; flash memory devices; electrical, optical, acoustical or other forms of propagated signals (e.g., carrier waves, infrared signals, digital signals, etc.), and others. In another form, a non-transitory article, such as a non-transitory computer readable medium, may be used with any of the examples mentioned above or other examples except that it does not include a transitory signal per se. It does include those elements other than a signal per se that may hold data temporarily in a "transitory" fashion such as RAM and so forth.

References in the specification to "one implementation", "an implementation", "an example implementation", etc., indicate that the implementation described may include a particular feature, structure, or characteristic, but every implementation may not necessarily include the particular feature, structure, or characteristic. Moreover, such phrases are not necessarily referring to the same implementation. Further, when a particular feature, structure, or characteristic is described in connection with an implementation, it is submitted that it is within the knowledge of one skilled in the art to effect such feature, structure, or characteristic in connection with other implementations whether or not explicitly described herein.

As used herein, the term "coder" may refer to an encoder and/or a decoder. Similarly, as used herein, the term "coding" may refer to performing video encoding via an encoder and/or performing video decoding via a decoder. For example a video encoder and video decoder may both be examples of coders capable of coding video data. Further, an encoder may have components for decoding, and a decoder may have components for encoding. In addition, as used herein, the term "codec" may refer to any process, program or set of operations, such as, for example, any combination of software, firmware, and, or hardware, that may implement an encoder and/or a decoder. Further, as used herein, the phrase "motion data" may refer to any type of data associated with inter prediction including, but not limited to, one or more motion vectors, reference indices, and/or inter directions.

Systems, apparatus, articles, and methods are described below related to coding unit size dependent simplified depth coding for 3D video coding as described herein.

As mentioned above and described in greater detail below, the disclosure herein is directed to 3D-HEVC video coding with multiview video and depth (MVD) coding using Simplified Depth Coding (SDC) for intra-prediction coding of depth maps. HEVC provides partitioning of images into coding units of 8×8, 16×16, 32×32 or 64×64 (measured in pixels). SDC intra-coding of the coding units includes at least three different types of coding modes: intra_DC (where DC stands for depth coding), intra_Planar, and intra_DMM (where DMM stands for Depth Modeling Mode). Intra_DC uses values of neighboring pixels on neighboring coding units along the sides of the current coding unit to predict values within the current coding unit. Planar prediction uses neighboring pixels along the sides and corners of the coding unit to predict values within the coding unit. DMM divides the coding unit by a line from edge to edge of the coding unit into wedgelets (or alternatively contours when the lines are not straight) and each wedgelet is coded separately. More details are provided below.

In the current 3D-HEVC Test Model 3, however, 3D-HEVC Test Model 3 includes a coding block size limitation for intra_DMM and may limit intra_DMM coding to code blocks less than 64×64 pixels. For 64×64 SDC-coded coding unit, intra_DC or intra_planar is used rather than intra_DMM. A two bit binary code is needed to signal the intra_DC (binary code is 1), intra_DMM (binary code is 01), and intra_planar (binary code is 00) for a 64×64 SDC-coded CU. This results in at least some redundant context allocations since intra_DMM would not be used for a 64×64 SDC-coded coding unit. Instead, for example, the binary code of intra_DC and intra_planar can be 1 and 0, respectively, for a 64×64 SDC-coded CU.

Further, the maximum block size of intra prediction processing for all of the other intra coding approaches in 3D-HEVC Test Model 3 also may be limited to 32×32. Thus, the SDC approach in 3D-HEVC Test Model 3 for allowing 64×64 intra prediction cannot be implemented in the traditional intra pipeline. This raises the need for additional control logic and processing modules dedicated to SDC of 64×64 coding units, which will result in extra complexity and cost for hardware implementations.

The present disclosure resolves this by providing the option to select one of at least three possible ways to intra-code the 64×64 coding unit while using SDC. First, the coding system may be set with a constraint so that a 64×64 coding unit block cannot trigger a simplified depth coding (SDC) flag. In this case, simplified depth coding is omitted altogether for that coding unit. Instead, other non-SDC depth map intra and inter prediction will proceed for the 64×64 block. By an alternative second method, the 64×64 coding units may be further partitioned into 32×32 (or other size) prediction units (PUs) or blocks for coding. Each PU is then intra-coded by intra_DMM and provides two segments or two residuals for each PU. Otherwise, in a third method, when SDC is selected for a 64×64 CU, the coding may be limited to one of the other non-DMM SDC coding modes, such as intra_DC or intra_planar for intra-prediction coding of the 64×64 CU.

Referring to FIG. 1, a video content system 100 uses 3D-HEVC video coding with Multiview Video plus Depth (MVD) processing to represent the 3D video content. In such a system, the encoder or sender side 102 may receive input data 104 including raw image data from video capture devices, such as video cameras for one non-limiting example. The raw image data may include texture views 106 such as that provided in RGB format or other know formats that provide luminance and chromatic information on a pixel basis, and typically on a sampled basis such as 4:2:0 for HEVC coding, although other sampling ratios also may be used. The texture views 106 may include multiple pictures (or frames) taken from multiple camera positions at a single instant in time. Input data 104 may also include depth maps 108, where each depth map 108 corresponds to a texture view, and includes data on a sampled per pixel basis that indicates the distance of the object in an image from the camera lens, and on a scale such as 1 to 255. Camera parameters 110 also may be provided in the input to provide the camera position or angle (for example, the scale and offset) as well as other data for the multiple views of the same time instant.

The input may be provided to a video coding system 200 that includes an encoder or other coding device 114 in order to compress and pack the texture views, depth maps, camera parameters, and other data into a bitstream 116 for transmission to a decoder 118 at a receiver side device 120. The decoder 118 demuxes and decompresses the data, and provides the texture views 124, depth maps 126, and camera parameters 128 to a synthesis prediction module 122 in order to create and/or fill in views and depth maps with the use of the camera parameters transmitted in the bitstream or obtained otherwise. Once the images are configured, the images may be displayed on a 3D auto-stereoscopic display 130 with a display screen so that the image changes depending on the angle to, and motion of, a user 134 viewing the display screen. It will be understood that some or all of the output and post-processing 132 components may or may not be considered to be part of the decoder 118.

Figure 11A:
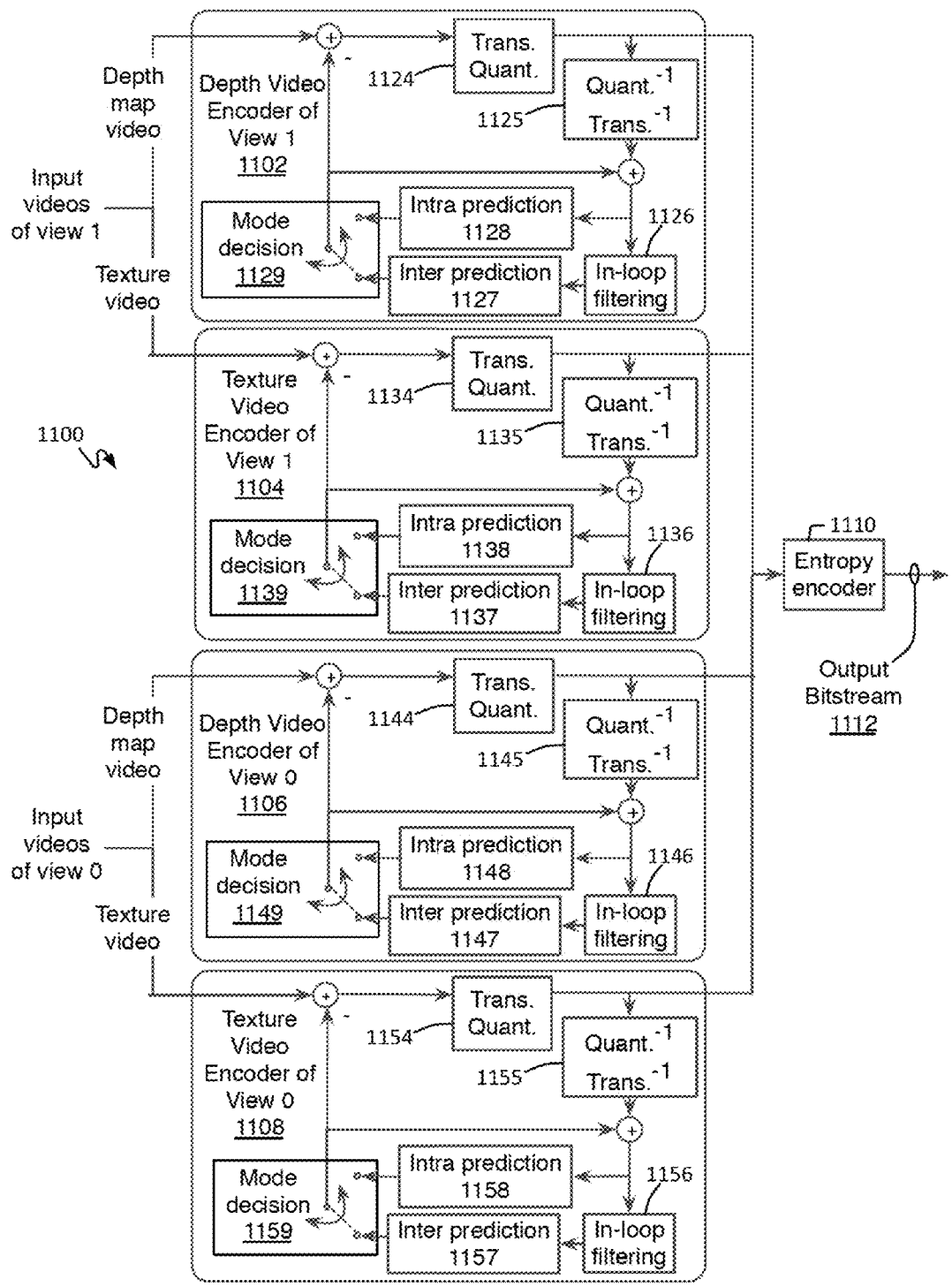
FIG. 11A is an illustrative diagram of a first part of a video coding system.
Figure 11B:
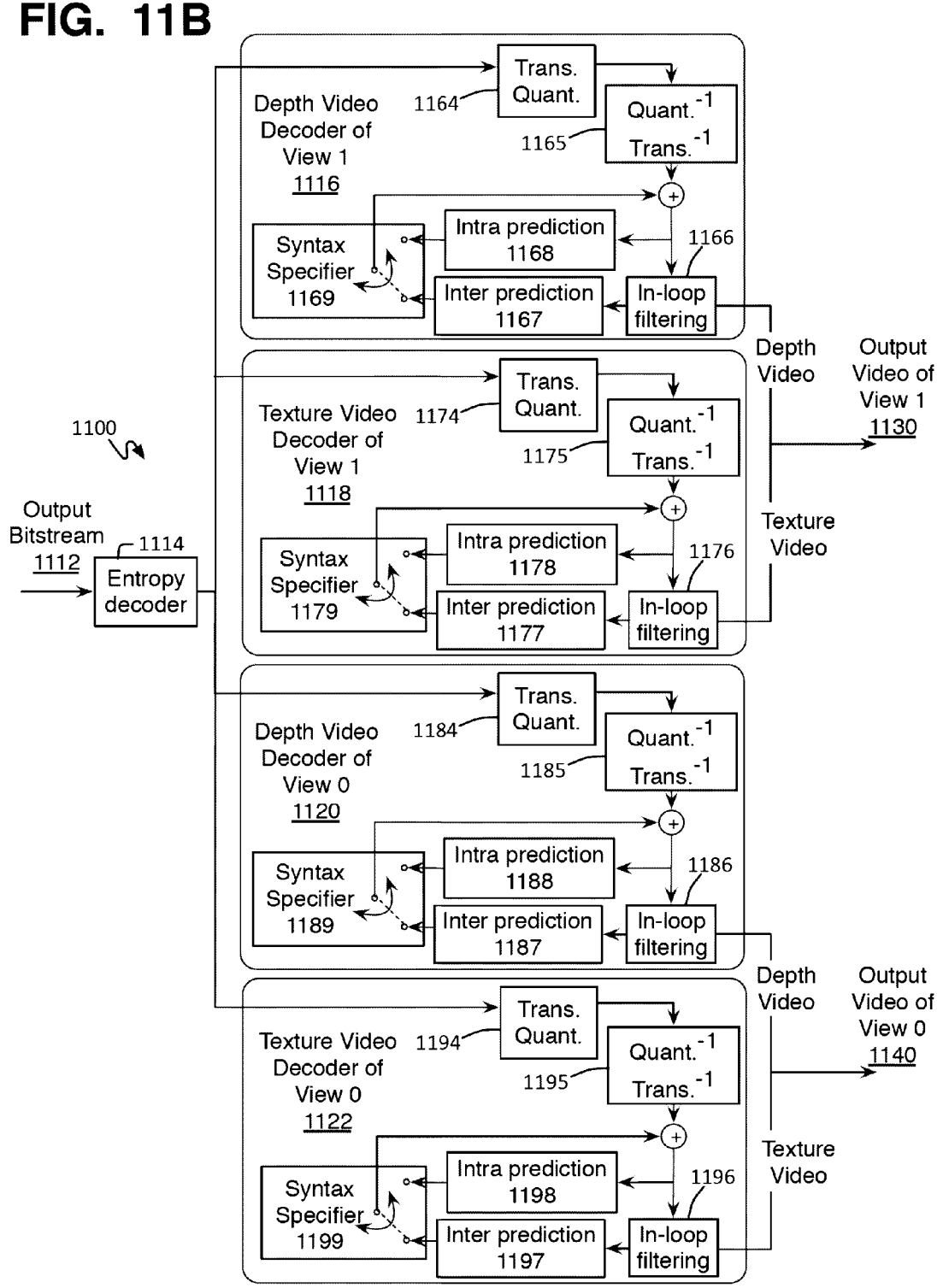
FIG. 11B is an illustrative diagram of a second part of the video coding system of FIG. 11A.

Referring to FIGS. 11A-11B, a video coding system 1100 may be used with the video content system 100. As mentioned above, HEVC may be used as the compression standard such as that described by Recommendation ITU-T H.265 and ISO/IEC 23008-2 MPEG-H, Part 2 (April 2013)

(see, ITU-T website www.itu.int/rec/T-REC-H.265-201304-I) and provided by the Joint Collaborative Team on Video Coding (JCT-VC) formed by ISO/IEC Moving Picture Experts Group (MPEG) and ITU-T Video Coding Experts Group (VCEG). Similar to previous video coding standards, HEVC includes basic functional modules such as intra/inter prediction, transform, quantization, in-loop filtering, and entropy coding, as well as other codec processes, and the encoder may include a prediction loop to reconstruct images similar to or the same as performed by the decoder in order to use the reconstructed images as reference images for prediction of further images and formation of prediction residuals to be transmitted to the decoder.

Specifically, for one implementation the video coding system 1100 may be organized mainly by views. Each view may have a texture frame and a corresponding depth map for each view at a single point in time. Here only two views are described but there may be more such as five to ten views associated with a single time instance by one example. View 0 may be an independent view, while view 1 and other views represent the dependent views. In this way, view 1 may be coded in 2D while the other views may be separately coded in 3D. The video or image data for the view is divided into texture video data and depth map video data. The depth map video data for view 0 for example is provided to a depth video encoder 1106 while the texture data is provided to a texture video encoder 1108. Similarly, the depth map video data for view 1 may be provided to a depth video encoder 1102 while the texture video data may be provided to a texture video encoder 1104. The depth maps are reconstructed and compressed as well as the textural images, provided to an encoder 1110 and placed in an output bitstream 1112. Output bitstream 1112 is received at a decoder side by an entropy decoder 1114, and the process from above is reversed to decompress the depth map data and textural data for views 1 and 2. This results in a reconstructed 3D output video or frame (or picture or image) for view 1 (1130) obtained from a depth map decoder 1116 and a texture video decoder 1118. View 0 may be similarly decoded at a depth video decoder 1120 and texture video decoder 1122, resulting in an output video frame for view 0 (1140).

Each of the encoders and decoders have the same or similar main components with functional differences explained in more detail with video coding system 200. Here, encoder 1102 of system 1100 may have a transform/quantization module 1124 which provides lossy compressed data to the bitstream. A frame or depth map reconstruction loop for prediction and rebuilding of frames or depth maps may have an inverse quantization/transform module 1126, an in-loop filter 1126, inter-prediction module 1137, intra-prediction module 1128, and mode decision control 1129. Each of the encoders and decoders mentioned have similar components numbered similarly (for example, intra-prediction module 1337 for view 1 may have at least some similar functions to intra-prediction module 1537 for view 0, and so forth).

Figure 2:
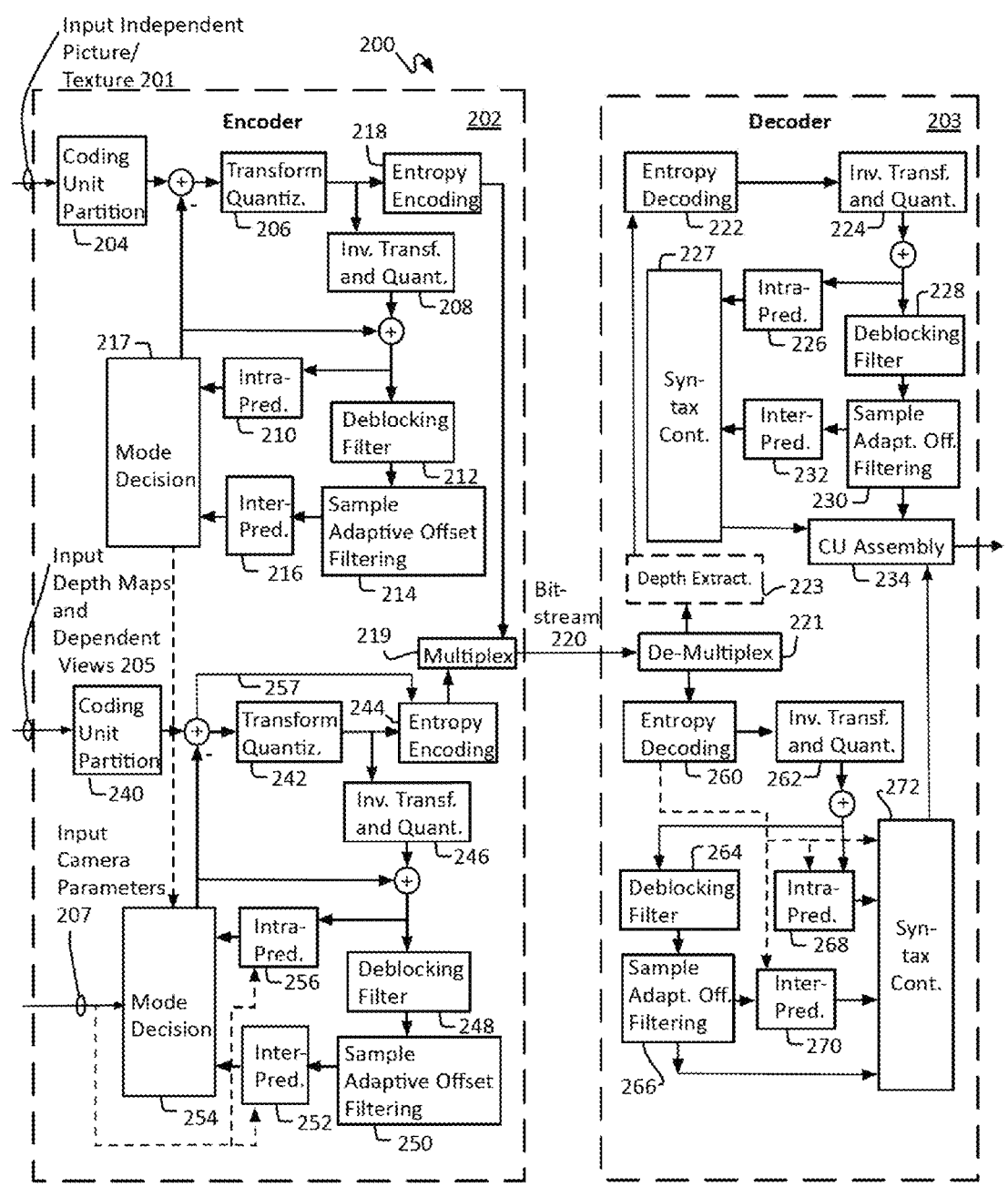
FIG. 2 is an illustrative diagram of a video coding system.

Referring now to FIG. 2, a more detailed video coding system 200 is explained. System 200 may have a 2D side for the main or independent frame (which may also be view 0 for system 1100) that is distinct from a 3D side that receives dependent views, depth map data, and camera parameters, explained in greater detail below. The HEVC standard specifies that a picture may be partitioned into non-overlapping Largest Coding Units (LCUs) and each LCU may then be partitioned into Coding Units (CUs) that take the form of rectangular blocks having variable sizes. Within each LCU, a quad-tree based splitting scheme specifies the CU partition pattern. HEVC also defines Prediction Units (PUs) and Transform Units (TUs) that specify how a given CU is to be partitioned for prediction and transform purposes, respectively. A CU ordinarily includes one luma Coding Block (CB) and two chroma CBs together with associated syntax, and a PU may be further divided into Prediction Blocks (PBs) ranging in size from 64×64 samples down to 4×4 samples. As used herein, the term "block" may refer to any partition or sub-partition of a video picture. For example, a block may refer to video data corresponding to an LCU, a PU, a PB, a TU, or a CU.

3D-HEVC with MVD may be configured to permit different types of displays by extracting depth data and unneeded packets from the bitstream. Thus, while a 3D decoder may make full use of the depth data on the bitstream, a stereo video decoder and a 2D decoder may still use the bitstream from the 3D encoder by extracting the unneeded data from the bitstream. In order to provide this feature, an independent or base view is coded by using 2D (or regular) video coding. For explanatory purposes, the video coding system 200 shows some of the components used for 2D or regular coding, and another set of components for 3D coding. It will be understood, however, the same component or module may be used to perform similar tasks for both 2D and 3D video coding.

As illustrated, video coding system 200 may include an encoder 202 and a decoder 203. For processing independent pictures 201, a coding unit partition module 204 first partitions the frames or pictures 201 into blocks. For this example, HEVC compresses a picture or texture view by partitioning it into multiple non-overlapped blocks, which are denoted as Coding Units (CUs). A texture view CU contains a square block of 2N×2N Luma pixels and two corresponding blocks of Chroma pixels. The size of a CU can be configured to be 8×8, 16×16, 32×32 or 64×64 in Luma component.

Encoder 202 may then encode input pictures 201 using a coding loop that may include a transform and quantization module 206, an inverse quantization and inverse transform module 208, and, depending on the mode decision implemented by encoder 202 via mode decision module 217, either a first path including an intra-prediction module 210, or a second path including a deblocking filtering module 212, a sample adaptive offset filtering module 214 and an inter prediction module 216 that may include motion estimation and motion compensation features. After transforming input pictures 201, encoder 202 may entropy encode the compressed images and residuals using entropy encoding module 218. Finally, encoder 202 may use a multiplexer 219 to add the independent frame data packets to a bitstream 220 that incorporates the coded video data.

Decoder 203 may receive coded video data in the form of bitstream 220. For 2D decoding, the decoder may have a depth data extractor 223 that filters out the depth data from the data stream 220 and provides the remaining data to, an entropy decoding module 222 and an inverse quantization and inverse transform module 224. The resulting image data may be placed through a decoding prediction loop employing, depending on the coding mode indicated in syntax of bitstream 220 and implemented via syntax control module 227, either a first path including an intra-prediction module 226, a second path including a deblocking filtering module 228, a sample adaptive offset filtering module 230, and an inter prediction module 232. Decoder 203 may then employ a coding unit assembling module 234 to generate decoded output pictures, which may be presented to a user via a display, for example.

3D-HEVC Test Model 3 from JCT-3V-C1005, Geneva, CH, January 2013, incorporated herein in its entirety, provides a protocol for coding of a 3D video bitstream and display of 3D images in a format similar to Multiview Video plus Depth (MVD). To perform the 3D video coding, by one example form, each texture view (hereinafter referred to simply as a view) has a corresponding depth map for display of the images. The views and depth maps are organized into access units where each access unit represents all of the views and their corresponding depth maps for a single instant in time. Each view in an access unit may provide an image for a different camera position, and multiple access units may contain views from the same group of camera positions. These views may be coded in the same order for multiple or all of the access units although the views may not be coded in camera position order from left to right for example. In other words, coded view 1 in an access unit may always be the center view, the next view, view 2, the farthest view to the left, and the next view, view 3, may be the farthest view to the right, and so on. Many examples are possible.

By one approach, the first view coded for each access unit may or may not be the independent view. The independent view is coded using the 2D coding system as described above, for example. The independent views may then be used as reference views to code the dependent views and the depth map for one or more of the other views. By one approach, the access units may be coded in similar fashion to the I, P, B slice coding used in the 2D coding. In other words, one access unit may be referred to as an instantaneous decoding refresh (IDR) access unit, in which the video pictures and depth maps in this access code do not use any reference views or depth maps outside of the IDR access unit. Such an access unit may be a random access, or clean random access (CRA) unit. While an IDR may be limited to intra-coding for all of its views and depth maps, in one form, inter-coding among the views and depth maps within the IDR still may be performed.

In addition to the independent views, for 3D multiview coding, the system 200 may receive raw image data that may include dependent views 205 providing multiple views for a single instant in time as well as camera parameters 207 to provide information on the position of the camera for the disparity among the multiple views in an access unit. The camera parameters also may be provided to the mode decision control 254 as well as the intra and inter prediction modules 252 and 256 to be used for reconstructing textural images using inter-view vector prediction and block-based view synthesis prediction on the encoder or decoder side.

As with 2D coding, the depth encoding side of the system 200 may include transform and quantization module 242 as well as a prediction and filter loop with an inverse transformation-quantization 246 module, deblocking filter 248, and sample adaptive offset filter 250 that is communicatively connected to an inter-prediction module 252, which in turn communicates with a Mode Decision module 254. Alternatively, an intra-prediction module 256 also communicates with the Mode decision module 254. The Mode Decision module 254 receives the view and depth map data, camera parameters, as well as reconstructed independent views from the 2D coding side of the encoder 202. The Mode Decision module 254 may provide reference frames, motion compensation data, disparity data (motion between views in an access unit), prediction residuals, and so forth back to the transform-quantization module 242 for entropy coding 244 along with the camera parameters, and then placement in the bitstream by a multiplexer 219 along with the 2D independent frames. Alternatively, a bypass 257 is provided for omitting the transform and quantization before entropy encoding, which is used in some circumstances for SDC residuals and/or motion data for example.

On the decoder side, again, the 3D coding components may be similar to the 2D components with a number of exceptions. As mentioned above, the textural and depth map data may be separated by a demux or de-mutiplex 221, and then provided to an entropy decoding module 260. The quantized data is then transmitted to the inverse transform/quantization module 262, and in turn filters 264, 266. Non-quantized data, such as camera parameters, disparity or motion vectors, and/or residuals may be provided directly to the inter-prediction or intra-prediction modules 268, 270 and syntax control 272 that reconstructs multiple views and depth maps. It is noted that the filters used for textural coding may not be used for depth map coding. The views and depth maps along with the independent views from the 2D side of the decoder are provided to a control unit (CU) assembly 234 for output and display of images or storage.

The 3D-HEVC MVD coding provides many different ways for prediction and reconstructing the multiple views and depth modes. Intra-prediction (spatial prediction) may be used on any view or depth map that is missing pixel information whether in the textural or depth domains, and whether alone or in conjunction with inter-prediction with the use of reference views or depth maps. Inter-prediction (or temporal prediction) for coding of dependent views may be performed, for one non-limiting example, by motion-compensated prediction (MCP) that uses the same previously coded view (same camera position) from different access units, or disparity-compensated prediction (DCP) which uses already coded views from the same access unit. Inter-view prediction for texture, motion prediction, and residual prediction may use combinations of reference views, intra-prediction, and disparity vectors obtained from depth maps.

Depth map coding also involves both inter-prediction coding using MCP and/or DCP except that interpolation is not used, and full sample accuracy may be used instead. Inter-prediction also may include using the view (texture) as a reference for its depth map, called motion parameter inheritance or depth quadtree prediction.

Intra-coding is also used for reconstructing depth maps. One type of intra-coding that may be used for coding depth maps is simplified depth coding (SDC). 3D-HEVC Test Model 3 from JCT-3VC-1005, Geneva, CH, January 2013, incorporated herein in its entirety, specifies a simplified depth coding (SDC) approach for depth map coding of 3D video data. The SDC coding approach is an extension of the intra coding mode. For an SDC-coded block, the prediction mode is still INTRA. An additional coding unit (CU) level SDC-flag signals the usage of the SDC mode. In one form, if a block is coded with SDC, the partition size of a CU is 2N×2N.

Figure 3:
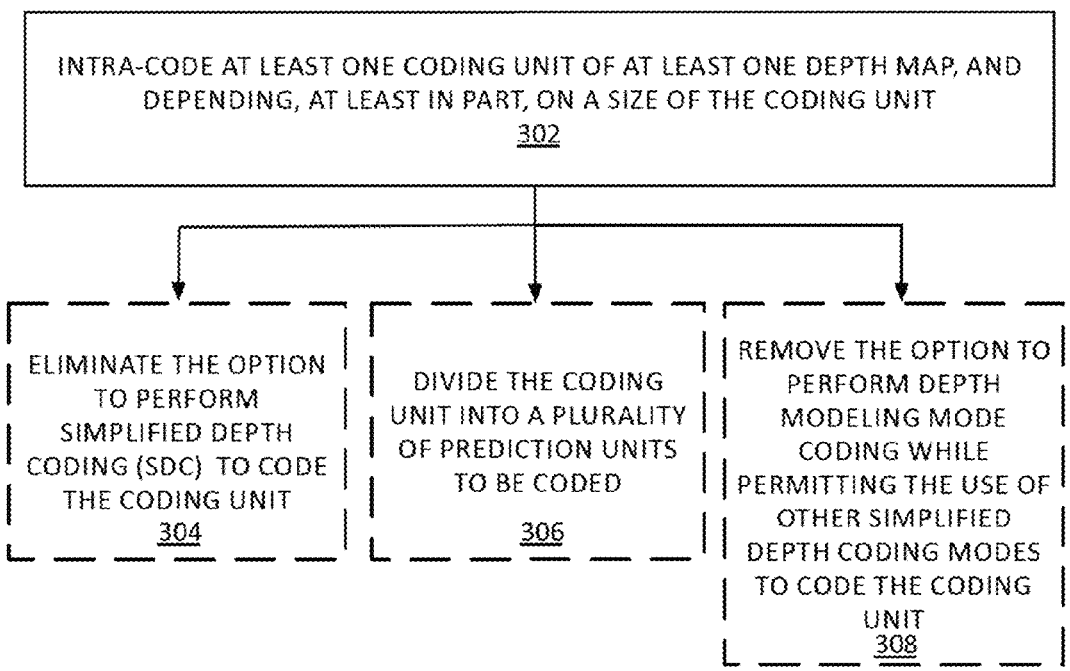
FIG. 3 is a flow chart illustrating an example coding process.

Referring to FIG. 3, in 3D-HEVC Test Model 3, the SDC prediction mode may provide at least three different ways to perform intra-prediction. These include intra depth coding (Intra_DC), intra planar coding (Intra_planar), and intra depth modeling mode (Intra_DMM or simply DMM). As explained above, however, DMM with 64×64 CUs is not usually provided. To address this, process 300 may be used as a computer-implemented method for 3D video coding.

Process 300 for a video coding system described herein is arranged in accordance with at least some implementations of the present disclosure. In the illustrated implementation, process 300 may include one or more operations, functions, or actions as illustrated by one or more of operations 302, 304, 306, and/or 308. By way of non-limiting example, process 300 may be described herein with reference to example video coding system of FIGS. 1-2 and 11A-11B.

Process 300 may include "INTRA-CODING OF AT LEAST ONE CODING UNIT OF AT LEAST ONE DEPTH MAP, DEPENDING, AT LEAST IN PART, ON THE SIZE OF THE CODING UNIT" 302. Thus, the process 300 includes coding of a coding unit (CU) that is associated with a plurality of pixels, and depending on the size of the CU, and in some forms, depending on whether the CU has 64×64 pixels, some SDC modes may be available and others may not be. Thus, depending on the size of the CU, at least one of the following may be performed.

The process 300 may include "ELIMINATE THE OPTION TO PERFORM SIMPLIFIED DEPTH CODING (SDC) TO CODE THE CODING UNIT" 304. In this case, depending, at least in part, on the size of the CU, SDC may be eliminated all together for that CU.

The process 300 may provide "REMOVE THE OPTION TO PERFORM DEPTH MODELING MODE (DMM) CODING WHILE PERMITTING THE USE OF OTHER SIMPLIFIED DEPTH CODING MODES TO CODE THE CODING UNIT" 306. With this process, only certain SDC modes are permitted. For example, for a CU of a certain size, intra_DC and intra_planar may be available but intra_DMM will not be available. For a CU that is not the specified size or smaller than the specified size, any of intra_DC, intra_planar, and intra_DMM would be available.

The process 300 may provide "DIVIDE THE CODING UNIT INTO A PLURALITY OF PREDICTION UNITS TO BE CODED" 308. By one form, the coding unit is divided into a plurality of prediction units to be coded so that the coding is not limited to less than all of the specific simplified depth coding modes available from the intra-coding and due to the coding unit being too large. By this form, a 64×64 pixel CU, for one non-limiting example, may be divided into four 32×32 pixel prediction units (PUs). The PUs may then be intra-coded using any of the SDC coding modes. These processes are explained in further detail below.

The processes, corresponding to processes 400, 500, and 600 described below, are respectively illustrated in FIGS. 4-6. While the figures describe the processes from the perspective of the decoder side, it will be understood that the operations may be performed at the encoder side and specifically including a prediction loop at the encoder.

Figure 4:
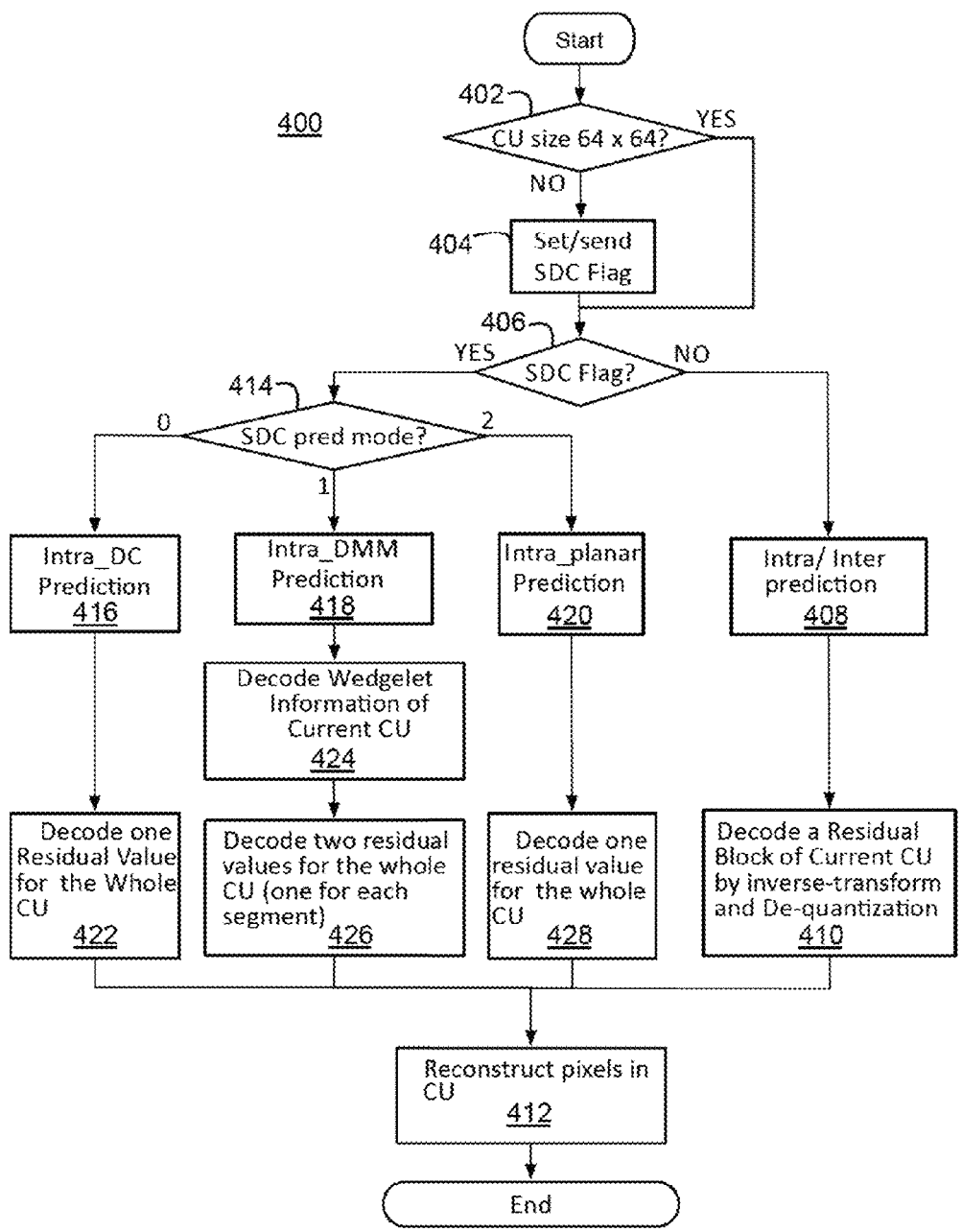
FIG. 4 is a flow chart of an example depth coding process.

Referring to FIG. 4 and Table 1 below, a process 400 may be similar to that used for decoding a SDC-coded CU in 3D-HEVC Test Model 3 in HTM6.1 for example, and modified for use with one of the methods described herein. Process 400 for a video coding system described herein is arranged in accordance with at least some implementations of the present disclosure. In the illustrated implementation, process 400 may include one or more operations, functions, or actions as illustrated by one or more of operations 402-428 numbered evenly. By way of non-limiting example, process 400 may be described herein with reference to example video coding system of FIG. 2 or 11A-11B.

In more detail, a series of modifications to simplified depth coding (SDC) may be applied so that the SDC intra prediction approaches are more compatible with any size coding unit including 64×64 pixels, and/or to reduce the implementation complexity of 3D video coding modules. Several possible SDC implementation methods for SDC-coded 64×64 CUs exist.

In a first method, a size-limited SDC approach may use an SDC flag that is signaled at CU levels when the CU size is smaller than 64×64 or other specified size. Thus, if the coding unit (CU) is the specified size, then simplified depth coding may be eliminated altogether. In detail, for process 400, the size of the coding unit or units are determined 402. If the coding unit is the specified size, such as 64×64 pixels by one example, then no SDC flag is set, and the SDC flag is inferred to have a value of zero by one approach, and which is not stored so that the SDC flag really has no value in this case. If the coding unit is other than a size of 64×64 pixels, such as smaller than that size (such as 32×32, 16×16, 8×8, and so forth), then a value is set 404 for the SDC flag, and in one example, is a non-zero value. To match the decoding modes to the encoding modes being used for the coding unit, the SDC flag may also be placed in a bitstream and explicitly sent/transmitted to a decoder. In either the encoder or the decoder side, the process 400 then determines 406 whether an SDC flag is present to initiate SDC.

Below is a table showing the example general coding unit syntax for using the SDC flag. In the example below, if log2CbSize is equal to 6, the SDC flag is inferred to be 0. If log2CbSize is smaller than 6, SDC flag is decoded from the syntax.

TABLE 1

|  | Descriptor |
|---|---|
| coding_unit( x0, y0, log2CbSize , ctDepth) { | |
| ... | |
|   if( slice_type != I ) | |
|     pred_mode_flag | ae(v) |
|   if( PredMode = = MODE_INTRA && DepthFlag && log2CbSize < 6) | |
|     sdc_flag[ x0 ][ y0 ] | ae(v) |
|   if( sdc_flag[ x0 ][ y0 ] ) { | |
|     sdc_pred_mode | ae(v) |
|     if( sdc_pred_mode = = 1 ) | |
|       wedge_full_tab_idx[ x0 ][ y0 ] | ae(v) |
|   } else { | |
|     if( ( PredMode[ x0 ][ y0 ] ! = MODE_INTRA || log2CbSize = = Log2MinCbSize ) && !predPartModeFlag) | |
|       part_mode | ae(v) |

If no SDC flag is present, indicating that the coding unit has the specified size, then simplified depth coding is skipped, and the process continues with intra/inter coding 408 of the pixels in the coding unit, the results of which are then added to residuals obtained from inverse transform/quantization 410 whether at the decoder in order to reconstruct 412 pixels in the coding unit or at the encoder within the prediction loop.

If the SDC flag is present, then the process determines 414 which SDC prediction mode has been indicated. Table 2 below shows an example of the correspondence between mode number, binary code, and intra prediction mode.

TABLE 2

| sdc_pred_mode | Binary Code | Associated Intra Prediction Mode |
|---|---|---|
| 0 | 0 | Intra_DC (1 segment) |
| 1 | 10 | Intra_DMM Mode1 (2 segments) |
| 2 | 11 | Intra_Planar (1 segment) |

For this example method, where the coding unit is not the specified size (64×64 pixels for example), and if mode 0 is selected, intra_DC prediction coding is performed 416. If mode 1 is selected, intra_DMM prediction coding is performed 418, and if mode 2 is selected intra_planar prediction coding is performed 420.

For both intra_DC and intra_planar coding, one segment is calculated, and for each resulting segment, a single constant residual value may be signaled in the bitstream and decoded 422, 428 for that coding unit. The residual of a depth-related SDC-coded CU is not coded as quantized transform coefficients. Another way to say this is that if sdc_pred_mode is Intra_DC or Intra_planar, then one segment exists for that whole CU, and to be used for reconstruction 412 of the pixels in the coding unit.

Otherwise, if sdc_pred_mode is Intra_DMM prediction 418, then the coding unit is partitioned into wedgelets, and in one form two wedgelets, so that each wedgelet has a segment and a resulting residual. Thus, in this case, wedgelet information, such as how to partition the coding unit, may be encoded, transmitted, and decoded 424 so that two residual values may be calculated and decoded 426 for the single (whole) coding unit to reconstruct 412 the pixels of the coding unit.

Figure 5:
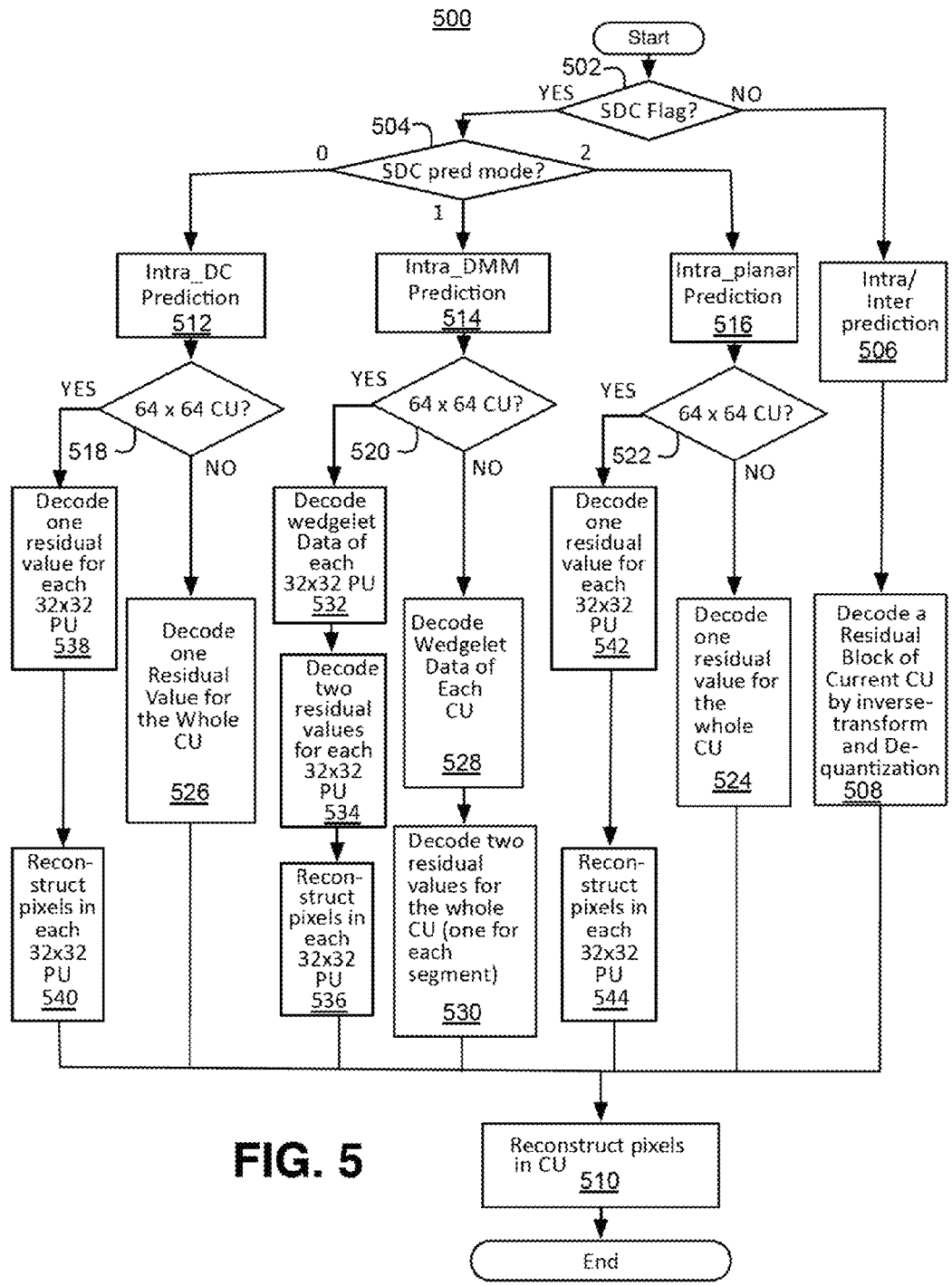
FIG. 5 is a flow chart of another example depth coding process.

Referring to FIG. 5, a second process 500 for a video coding system described herein is arranged in accordance with at least some implementations of the present disclosure. In the illustrated implementation, process 500 may include one or more operations, functions, or actions as illustrated by one or more of operations 502-544 numbered evenly. By way of non-limiting example, process 500 will be described herein with reference to example video coding system of FIG. 2 or 11A-11B.

A unified SDC approach for 64×64 CUs is applied so that any of the simplified depth coding modes can be used with any of the coding unit sizes (or at least that intra_DC, intra_planar, and intra_DMM prediction mode can be used with any presently used coding unit size). This is accomplished by dividing a 64×64 CU into prediction units (PUs). A PU is the basic unit for prediction of a 2N×2N CU while the coding unit may be considered the basic coding unit. Generally, a CU can be split into multiple PUs, and prediction analysis is then performed on each PU. Whether CUs can be divided into PUs for the prediction analysis depends on the type of prediction performed. In one example form, if a 64×64 CU is not divided, then the PU size is 64×64. Otherwise, if a 64×64 CU is split into four partitions (four PUs), then the PU size of each partition is 32×32. It will be understood that it is possible to divide the CU into blocks of many other sizes other than 32×32 if desired.

In more detail, process 500 determines if an SDC flag is present 502. In this case, in contrast to process 400, the flag may be present even though the coding unit size is 64×64. If no flag is present, the process proceeds with regular coding at operations 506, 508, and 510 as explained above for process 400. If the SDC flag is present, process 500 continues to determine 504 which prediction mode has been selected. For process 500 where the coding unit may be divided into prediction units, any of the simplified depth coding modes may be chosen. Thus, Intra_DC prediction 512, Intra_DMM prediction 514, or Intra_planar prediction 516 may be selected. The size of the coding unit is then determined 518, 520, 522. If the coding unit is other than, or smaller than, 64×64, then for intra_planar and intra_DC coding, one residual value may be calculated for the coding unit, encoded and transmitted (from the encoder side), and decoded 524, 526 for the decoder side. This may provide a single residual value for the whole coding unit. The residual value then may be used to reconstruct 510 pixels in the coding unit.

For intra_DMM with a coding unit that is other than, or smaller than, 64×64, wedgelet data for each coding unit may be encoded and/or decoded 528 to encode and/or decode 530 two residuals for each coding unit (one residual for each wedgelet or segment). The pixels may then be reconstructed 510 based on these residuals.

If the coding unit size is 64×64 pixels, the coding unit is partitioned, and in the present non-limiting example, into the four 32×32 PUs. The PUs share a simplified depth code prediction mode (sdc_pred_mode) so that all PU partitions in a coding unit are coded with the same SDC process including the same intra-coding algorithms. Thus, if the 64×64 SDC CU is signaled as Intra_DC prediction (or predicted) 512 or Intra_planar prediction (or predicted) 516, the same prediction type is performed albeit separately for each of the four 32×32 PUs. One residual value is signaled, and in turn encoded, transmitted, and/or decoded 538, 542, separately for each PU. In this case then, the coding unit may obtain multiple residuals, and one residual for each partition PU. In the present example, the coding unit has four residuals. Based on these residuals, the prediction units are reconstructed 540, 544, and the coding units are then reconstructed 510 based on the prediction units.

If the 64×64 SDC CU is signaled as Intra_DMM prediction (or predicted), DMM wedgelet information is signaled, encoded, and/or decoded 532 separately for each of the four 32×32 PUs. In this case, each PU is divided into wedgelets, and in one form, two wedgelets. DMM wedgelet information may be signaled for each PU. Intra_DMM prediction is performed on each PU separately so that two residual values may be signaled, encoded, and/or decoded 534 separately for each 32×32 PU. Thereafter, the pixels at the PU may be reconstructed 536 to reconstruct 510 the coding unit.

Figure 6:
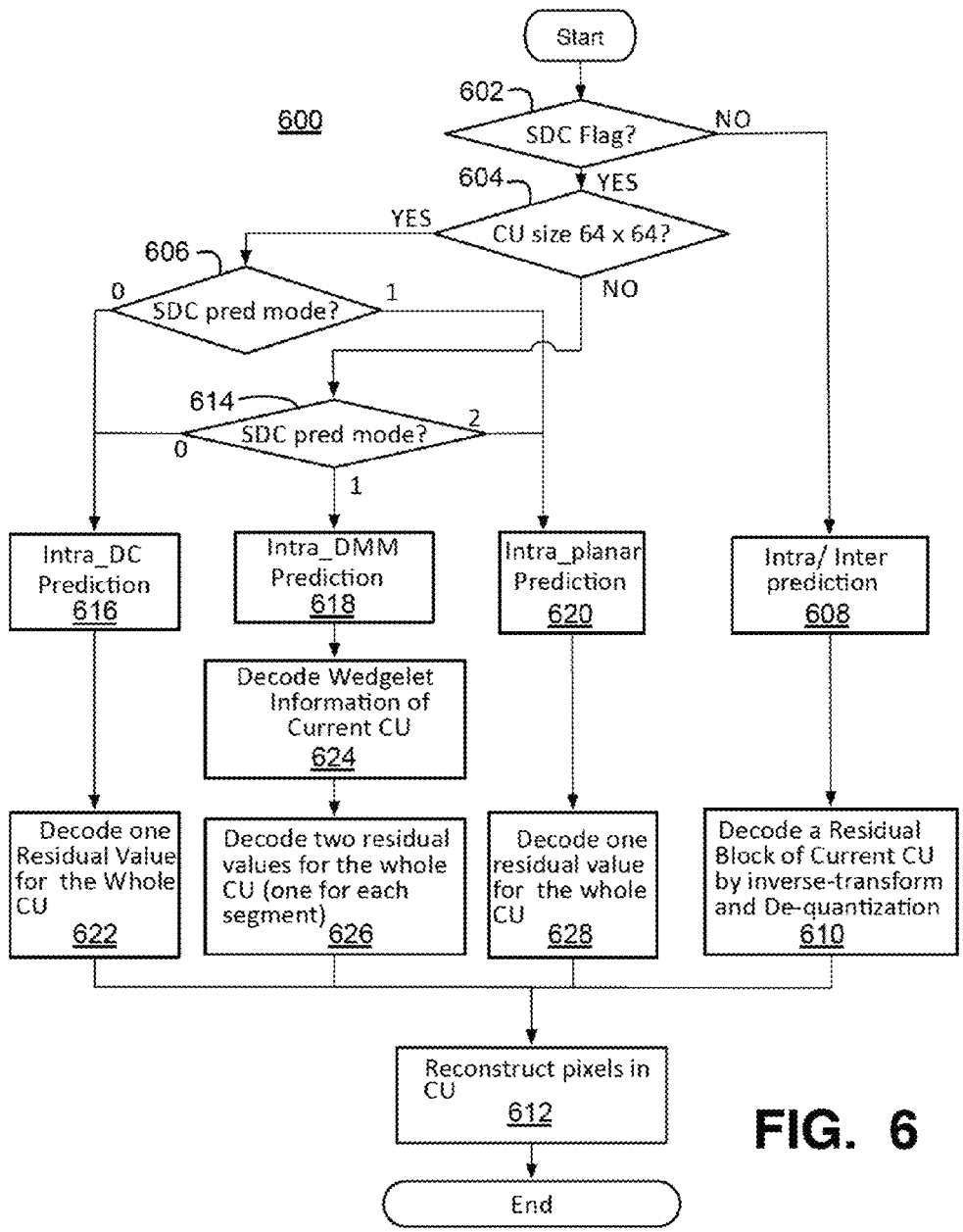
FIG. 6 is a flow chart of yet another example depth coding process.

Referring to FIG. 6, a simplified SDC process may be provided that removes the option to use the Intra_DMM prediction mode when the coding unit has a specified size, such as 64×64 pixels. In this case, the other SDC prediction modes may be available but not intra_DMM coding.

In one form, process 600 includes checking for an SDC flag 602, and if none exists, preforming coding operations 608, 610, 612 as described previously with similar operations of process 400 or 500. If the SDC flag does exist, then the size of the coding unit is determined 604. If the coding unit is not 64×64 or other specified size, then the SDC prediction mode is determined 614, and the process continues through intra_DC, intra_planar, or intra_DMM prediction coding in operations 616 to 628 as described above similarly for process 400. In this case, the SDC prediction mode is determined based on the three options 0, 1, 2 previously described and as recited on Table 2.

If the coding unit is 64×64 pixels or other specified size, then a separate SDC prediction mode determination 606 is performed. Specifically, if the SDC CU size is equal to 64×64, the SDC prediction mode sdc_pred_mode may only indicate that Intra_DC or Intra_planar prediction modes may be used. Referring to the previous syntax and for bitstream conformance, the value of sdc_pred_mode may be 0 or 2 (as shown on table 2 above) when log 2CbSize is equal to 6. This signaling, however, requires that two bits in binary code be used to indicate the prediction mode. In other words, referring to Table 2 above, a two bit flag in binary code is used to signal the sdc_pred_mode such that the binary code of 64×64 SDC-coded CU is 0 for Intra_DC, but 11 for Intra_planar, as specified in 3D-HEVC Test Model 3.

Instead, an advanced SDC signaling method may be used for 64×64 SDC-coded CU to reduce the signal to a single bit. For example, for a 64×64 SDC-coded CU, sdc_pred_mode equal to 0 may indicate the Intra_DC mode, and sdc_pred_mode equal to 1 may indicate the Intra_planar mode as shown on Table 3 below. Thus, a one bit flag can be used to signal the sdc_pred_mode such that the binary code of 64×64 SDC-coded CU can be 0 for Intra_DC, and 1 for Intra_planar (or vice-versa).

TABLE 3

| sdc_pred_mode | Binary Code | Associated Intra Prediction Mode |
| --- | --- | --- |
| 0 | 0 | Intra_DC (1 segment) |
| 1 | 1 | Intra_Planar (1 segment) |

Proceeding with process 600, if the SDC prediction mode is 0, then intra_DC prediction 616 coding is initiated for a 64×64 coding unit. When a coding unit is SDC-coded (SDC flag is 1), and Intra_DC coding process is selected, the SDC coding may proceed the same or similar to that used for original SDC design provided by HTM reference software (no matter the size of the coding unit).

Likewise, if the SDC prediction mode is 1, then intra_planar prediction 620 coding is initiated. If a coding unit is SDC-coded (SDC flag is 1), and the Intra_planar coding process is selected, the coding may be the same or similar as the original SDC design provided by HTM reference software (that may be the same or similar no matter what the size of the coding unit). Otherwise, for intra_DC and intra_planar coding, the process continues with operations 622 and 628 similar to that already described in process 400 where, by one example approach, each coding unit is treated as a single segment so that a single residual will be obtained for each coding unit (CU) to reconstruct 612 the pixels in the coding unit.

For an H.9.3.2.1 binarization process for the SDC prediction mode sdc_pred_mode, inputs to this process are a request for a binarization for the syntax element sdc_pred_mode, which is the current luma coding block size log 2CbSize. Output of this process is the binarization of the syntax element. The binarization for the syntax element sdc_pred_mode is specified as follows on Table 4. The name Intra_DepthPartition(35) refers to the intra_DMM prediction coding (where the 35$^{th}$ intra direction is DMM1).

TABLE 4

| | | Binarization for sdc_pred_mode | |
| --- | --- | --- | --- |
| | | Bin string | |
| Value of sdc_pred_mode | Name of sdc_pred_mode | log2CbSize != 6 | log2CbSize == 6 |
| 0 | Intra_DC | 1 | 1 |
| 1 | Intra_Depth-Partition(35) | 01 | — |
| 2 | Intra_Planar | 00 | 0 |

By some implementations then, process 600 provides a method wherein a further simplification is applied by removing the Intra_DMM prediction mode from possible SDC prediction modes for 64×64 SDC-coded CU. For one example, the SDC approach for 8×8, 16×16 and 32×32 CUs can use Intra_DC, Intra_planar or Intra_DMM as the intra prediction mode, while the SDC approach for 64×64 CU uses Intra_DC or Intra_planar as the intra prediction mode.

Also, a CU size dependent SDC prediction mode signaling method is applied to the simplified SDC approach. For another example, if the SDC CU size is equal to 64×64, the sdc_pred_mode can be signaled by Intra_DC or Intra_planar. A 1 bit flag can be used to signal the sdc_pred_mode. For example, sdc_pred_mode equal to 0 stands for Intra_DC mode; and sdc_pred_mode equal to 1 stands for Intra_planar mode.

Also by this example, if the SDC CU size is equal to 8×8, 16×16 or 32×32, the sdc_pred_mode can be equal to Intra_DC, Intra_planar, or Intra_DMM. For example, sdc_pred_mode equal to 0 indicates the Intra_DC mode; sdc_pred_mode equal to 1 indicates Intra_planar mode; sdc_pred_mode equal to 2 indicates the Intra_DMM mode. Thus, up to 2 bits flag (binary code) is used to signal the sdc_pred_mode when the coding unit is not 64×64.

Figure 7:
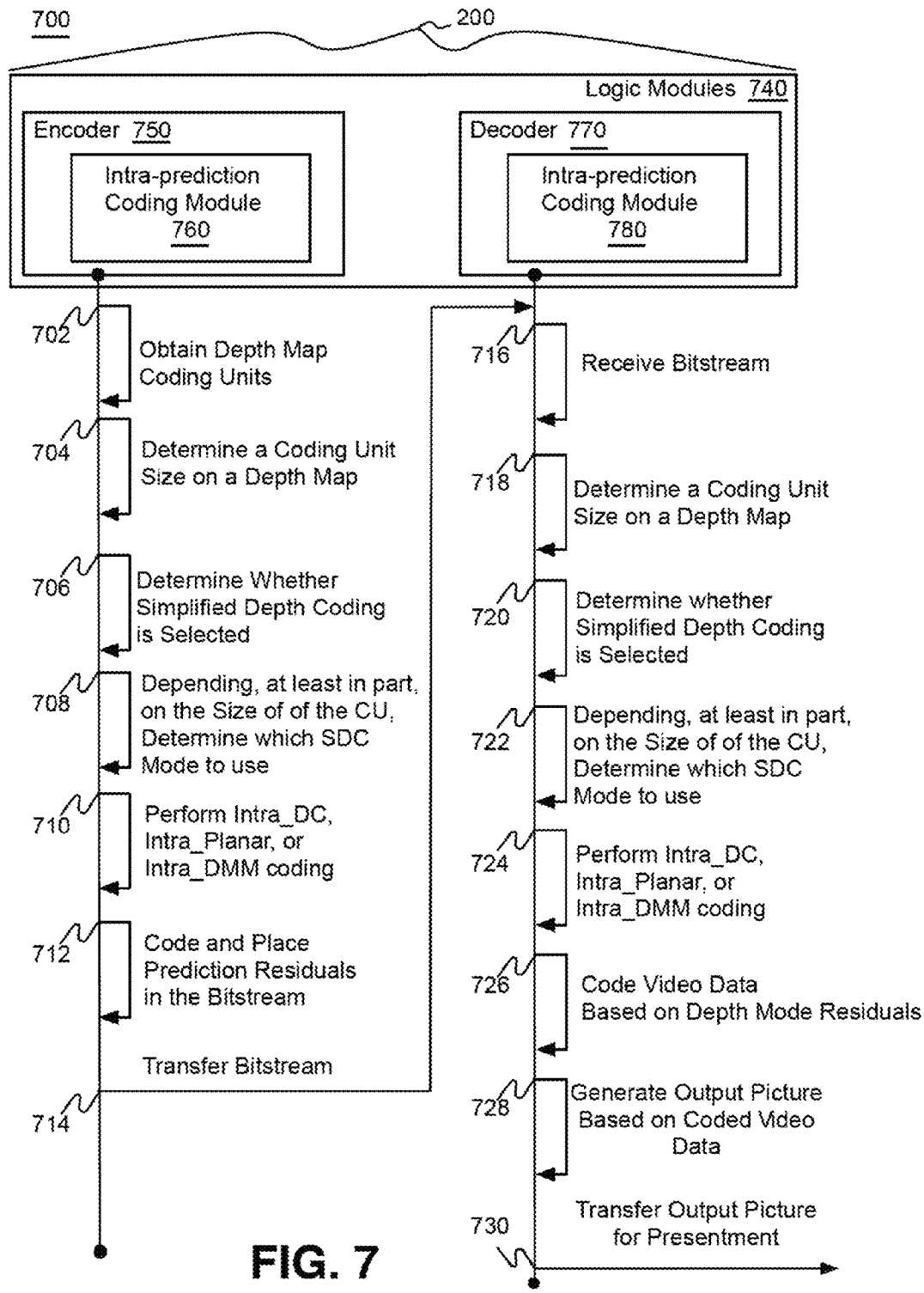
FIG. 7 is an illustrative diagram of an example video coding system in operation.

Referring now to FIG. 7, video coding system 200 or 1100 may be used for an example video coding process 700 shown in operation, and arranged in accordance with at least some implementations of the present disclosure. In the illustrated implementation, process 700 may include one or more operations, functions or actions as illustrated by one or more of actions 702-730 numbered evenly, and used alternatively or in any combination. By way of non-limiting example, process 700 will be described herein with reference to example video coding system 200 of FIG. 2 or 11A-11B.

In the illustrated implementation, video coding system 200 or 1100 may include logic modules 740, the like, and/or combinations thereof. For example, logic modules 740 may include encoder 750 and may correspond to encoder 202 or encoder 804 or encoders 1102-1108, for example. Encoder 750 may include intra-coding module 760. A decoder 770 may correspond to decoder 203 or decoder 810 or decoders 1116-1122, and decoder 770 may include intra-coding module 780. Although video coding system 200, as shown in FIG. 7, may include one particular set of operations or actions associated with particular modules, these operations or actions may be associated with different modules than the particular module illustrated here. Although process 700, as illustrated, is directed to encoding and decoding, the concepts and/or operations described may be applied to encoding and/or decoding separately, and, more generally, to video coding.

Process 700 may include "OBTAIN DEPTH MAP CODING UNITS" 702, where information about a depth map is obtained including the location and sizes of the coding units as well as which coding units already have depth values and which are still missing depth values.

Process 700 may then "DETERMINE A CODING UNIT SIZE ON A DEPTH MAP" 704 for a coding unit being analyzed. The process 700 may also include "DETERMINE WHETHER SIMPLIFIED DEPTH CODING IS SELECTED" 706 for that current coding unit. This may be performed, as mentioned above, depending on whether an SDC flag has a non-zero value, or some other similar indicator.

Process 700 continues with "DEPENDING, AT LEAST IN PART, ON THE SIZE OF THE CODING UNIT, DETERMINE WHICH SDC MODE TO USE" 708. In other words, depending on the size of the coding unit, and by one example whether the coding unit is 64×64 pixels, SDC may be omitted altogether, SDC may be limited to intra_DC coding and intra_planar coding but not intra_DMM coding, or SDC may not be limited to a particular mode at all depending on which of the methods discussed above are selected for intra-coding of coding units of a certain size.

Process 700 continues with "PERFORM INTRA_DC, INTRA_PLANAR, OR INTRA_DMM CODING" 710 to determine the depth map residual predictions for each of the coding units as discussed previously.

Process 700 then may "CODE AND PLACE THE PREDICTION RESIDUALS IN THE BIT STREAM" 712. Thus, the residuals are coded in a prediction loop as described with video coding system 200, and may be coded along with other texture and map data as well as camera data. The process 700 then includes "TRANSFER BITSTREAM" 714 where the encoded bit stream may be transferred to a decoder for example. In various implementations, the encoder 750 and decoder 770 may be operated substantially independently. In one example, one may be at content provider system and the other at a client system. In various examples, the bitstream may be transferred via the Internet, via a memory device, or the like. As will be appreciated, in some implementations, the bitstream may be transferred to multiple devices either serially or in parallel.

Process 700 may continue from "RECEIVE BITSTREAM" 716, where a bitstream associated with video data and including depth map coding unit information is included and may be received at decoder 770. From there, the decoder 770 operates its own prediction or reconstruction loop similar to the prediction loop operated by the encoder 750. Thus, operations to "DETERMINE A CODING UNIT SIZE ON A DEPTH MAP" 718. "DETERMINE WHETHER SIMPLIFIED DEPTH CODING IS SELECTED" 720, "DEPENDING, AT LEAST IN PART, ON THE SIZE OF THE CODING UNIT, DETERMINE WHICH SDC MODE TO USE" 722. "PERFORM INTRA_DC, INTRA_PLANAR, OR INTRA_DMM CODING" 724 are respectively similar to the operations 704, 706, 708, and 710 at the encoder 750. As with the encoder, these operations provide a segment or prediction residual for a coding unit, and calculated with an SDC mode depending, at least in part, on the size of the coding unit. In one example, depending, at least in part, on whether the coding unit is 64×64 pixels.

Process 700 may continue with "CODE VIDEO DATA BASED ON DEPTH MAP RESIDUALS" 726, where video data may be coded based at least in part on the depth map residuals. Thus, this may include determining depth map values for the pixels in coding units of a depth map from the residuals.

Process 700 may then include "GENERATE OUTPUT PICTURES BASED ON THE CODED VIDEO DATA" 728, where output pictures are generated based on the coded video data for ultimate display and/or storage of the pictures.

Process 700 may continue to "TRANSFER OUTPUT PICTURE FOR PRESENTMENT" 730, where the output picture may be transferred for presentment. For example, an output picture may be presented to a user via a display device. While implementation of example process 300, 400, 500, 600, or 700 may include the undertaking of all operations shown in the order illustrated, the present disclosure is not limited in this regard and, in various examples, implementation of any of the processes herein may include the undertaking of only a subset of the operations shown and/or in a different order than illustrated.

In implementations, features described herein may be undertaken in response to instructions provided by one or more computer program products. Such program products may include signal bearing media providing instructions that, when executed by, for example, a processor, may provide the functionality described herein. The computer program products may be provided in any form of one or more machine-readable media. Thus, for example, a processor including one or more processor core(s) may undertake one or more features described herein in response to program code and/or instructions or instruction sets conveyed to the processor by one or more machine-readable media. In general, a machine-readable medium may convey software in the form of program code and/or instructions or instruction sets that may cause any of the devices and/or systems described herein to implement at least portions of the features described herein. As mentioned previously, in another form, a non-transitory article, such as a non-transitory computer readable medium, may be used with any of the examples mentioned above or other examples except that it does not include a transitory signal per se. It does include those elements other than a signal per se that may hold data temporarily in a "transitory" fashion such as RAM and so forth.

As used in any implementation described herein, the term "module" refers to any combination of software logic, firmware logic and/or hardware logic configured to provide the functionality described herein. The software may be embodied as a software package, code and/or instruction set or instructions, and "hardware", as used in any implementation described herein, may include, for example, singly or in any combination, hardwired circuitry, programmable circuitry, state machine circuitry, and/or firmware that stores instructions executed by programmable circuitry. The modules may, collectively or individually, be embodied as circuitry that forms part of a larger system, for example, an integrated circuit (IC), system on-chip (SoC), and so forth.

Figure 8:
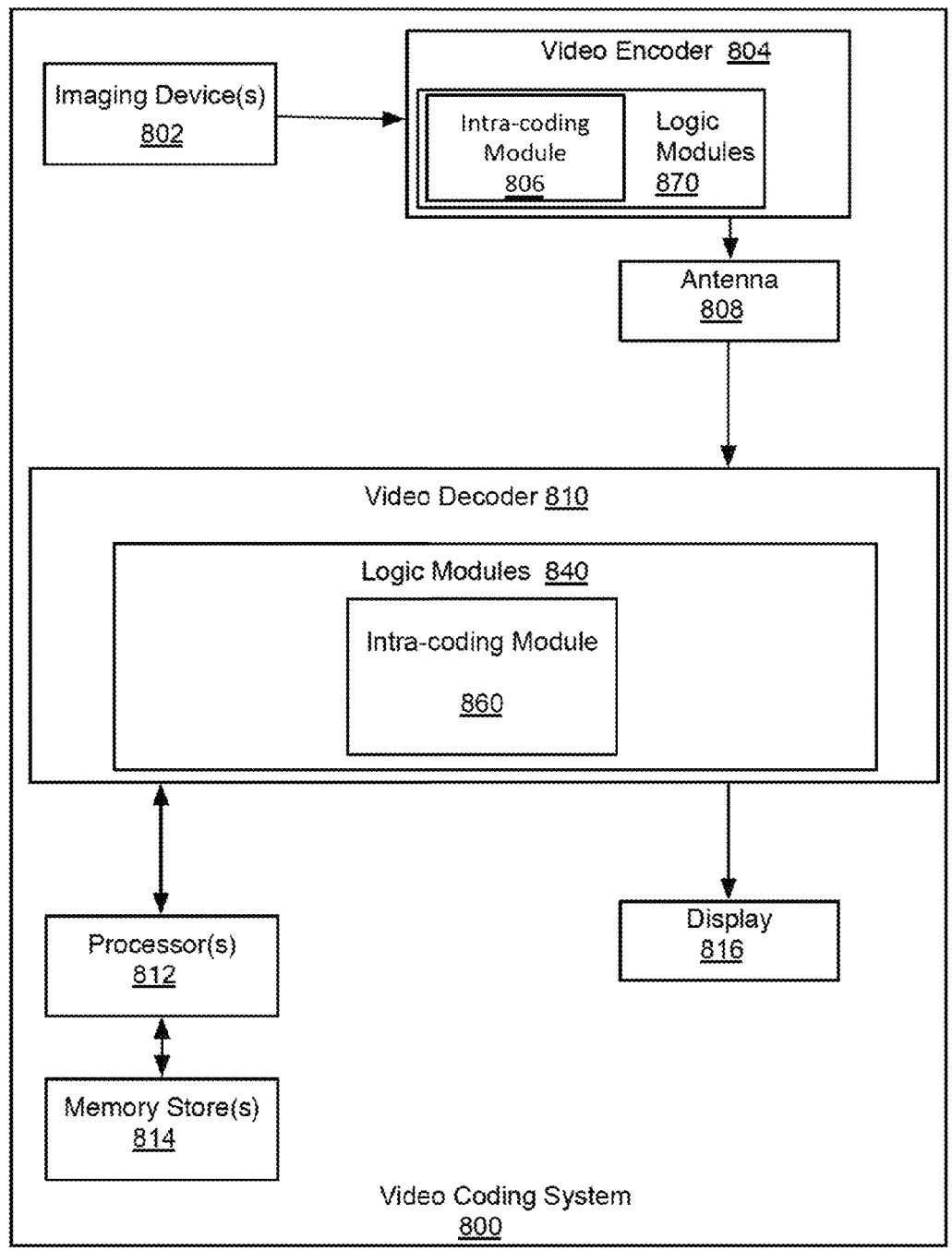
FIG. 8 is an illustrative diagram of an example system.

Referring to FIG. 8, an example video coding system 800 may be arranged in accordance with at least some implementations of the present disclosure. In the illustrated implementation, video coding system 800 may include imaging device(s) 802, a video encoder 804, an antenna 808, a video decoder 810, one or more processors (or processor cores) 812, one or more memory stores 814, and at least one display 816. In some examples, video encoder 804 may implement one or more logic modules 820 which may include an intra-coding module 806, other modules, and the like, or any combination thereof. Likewise, the video decoder 810 may have logic modules 840 with an intra-coding module 860, the like, and/or combinations thereof. As illustrated, antenna 808, video decoder 810, processor 812, memory store 814, and/or display 816 may be capable of communication with one another and/or communication with portions of logic modules 840. Similarly, imaging device(s) 802 and video encoder 804 may be capable of communication with one another and/or communication with portions of logic modules 820, other modules, the like, or combinations thereof. Accordingly, video decoder 810 may include all or portions of logic modules 840, while video encoder 804 may include similar and/or other logic modules 820. Although video coding system 800, as shown in FIG. 8, may include one particular set of processes, process steps, operations, functions, and/or actions associated with particular modules, these actions may be associated with different modules than the particular module illustrated here.

In some examples, video coding system 800 may include antenna 808, video decoder 810, the like, and/or combinations thereof. Antenna 808 may be configured to receive an encoded bitstream of video data. Video encoder 804 may be communicatively coupled to antenna 808 to encode a bitstream and transfer the bitstream via antenna 808 to video decoder 810 for the video decoder to decode the encoded bitstream. Video encoder 804, video decoder 810, or both may be configured to intra-code at least one coding unit of at least one depth map, and depending on the size of the coding unit, using at least one simplified depth coding mode, as discussed herein.

In other examples, video coding system 800 may include at least one display device 816, one or more processors 812, one or more memory stores 814, intra-coding module 860, the like, and/or combinations thereof. Display device 816 may be configured to present video data such as output pictures. Processors 812 may be communicatively coupled to display 816. Memory stores 814 may be communicatively coupled to the one or more processors 812. Video decoder 810 (or video encoder 804 in other examples) may be communicatively coupled to the one or more processors 812 and may be configured to intra-code at least one coding unit of at least one depth map, and depending on the size of the coding unit, using at least one simplified depth coding mode, and simplify depth code the video data based at least in part on the size of the coding unit, such that the presentment of image data via display device 816 may be based at least in part on the coded video data. Processors may also be provided for the encoder and communicatively coupled to a display, memory stores, logic modules, and so forth.

In various implementations, intra-coding module 806 or 860 or both may be implemented in hardware, while software may implement other logic modules. For example, in some implementations, modules 806 and 860 may be implemented by application-specific integrated circuit (ASIC) logic while other logic modules may be provided by software instructions executed by logic such as processors 812. However, the present disclosure is not limited in this regard and intra-coding modules 806 and 860 and/or other logic modules may be implemented by any combination of hardware, firmware and/or software. In addition, memory stores 814 may be any type of memory such as volatile memory (e.g., Static Random Access Memory (SRAM), Dynamic Random Access Memory (DRAM), etc.) or non-volatile memory (e.g., flash memory, etc.), and so forth. In a non-limiting example, memory stores 814 may be implemented by cache memory.

Figure 9:
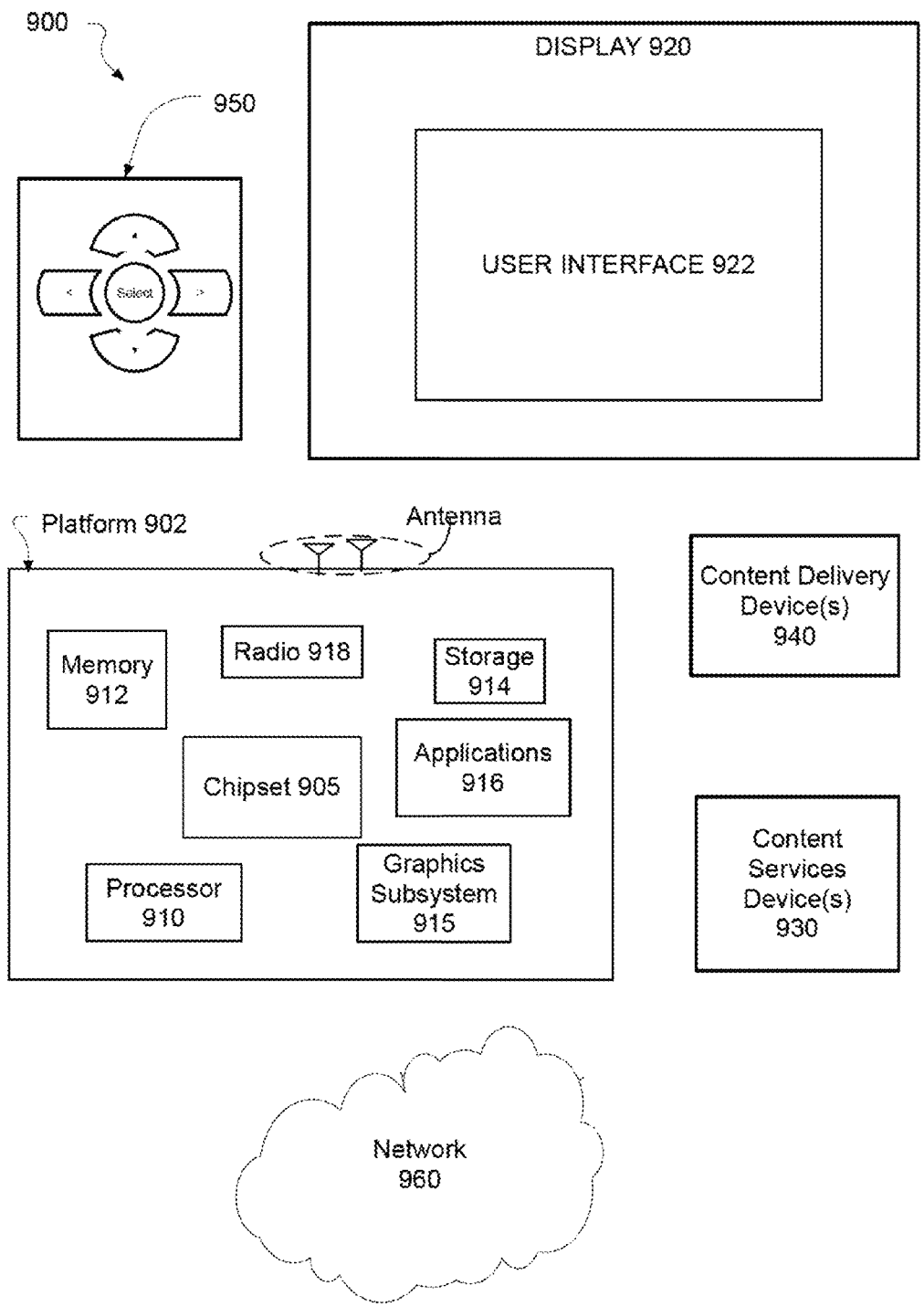
FIG. 9 is an illustrative diagram of another example system.

Referring to FIG. 9, an example system 900 in accordance with the present disclosure, in various implementations, may be a media system although system 900 is not limited to this context. For example, system 900 may be incorporated into a personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, cameras (e.g. point-and-shoot cameras, super-zoom cameras, digital single-lens reflex (DSLR) cameras), and so forth.

In various implementations, system 900 includes a platform 902 coupled to a display 920. Platform 902 may receive content from a content device such as content services device(s) 930 or content delivery device(s) 940 or other similar content sources. A navigation controller 950 including one or more navigation features may be used to interact with, for example, platform 902 and/or display 920. Each of these components is described in greater detail below.

In various implementations, platform 902 may include any combination of a chipset 905, processor 910, memory 912, antenna 913, storage 914, graphics subsystem 915, applications 916 and/or radio 918. Chipset 905 may provide intercommunication among processor 910, memory 912, storage 914, graphics subsystem 915, applications 916 and/or radio 918. For example, chipset 905 may include a storage adapter (not depicted) capable of providing intercommunication with storage 914.

Processor 910 may be implemented as a Complex Instruction Set Computer (CISC) or Reduced Instruction Set Computer (RISC) processors, x86 instruction set compatible processors, multi-core, or any other microprocessor or central processing unit (CPU). In various implementations, processor 910 may be dual-core processor(s), dual-core mobile processor(s), and so forth.

Memory 912 may be implemented as a volatile memory device such as, but not limited to, a Random Access Memory (RAM), Dynamic Random Access Memory (DRAM), or Static RAM (SRAM).

Storage 914 may be implemented as a non-volatile storage device such as, but not limited to, a magnetic disk drive, optical disk drive, tape drive, an internal storage device, an attached storage device, flash memory, battery backed-up SDRAM (synchronous DRAM), and/or a network accessible storage device. In various implementations, storage 914 may include technology to increase the storage performance enhanced protection for valuable digital media when multiple hard drives are included, for example.

Graphics subsystem 915 may perform processing of images such as still or video for display. Graphics subsystem 915 may be a graphics processing unit (GPU) or a visual processing unit (VPU), for example. An analog or digital interface may be used to communicatively couple graphics subsystem 915 and display 920. For example, the interface may be any of a High-Definition Multimedia Interface, DisplayPort, wireless HDMI, and/or wireless HD compliant techniques. Graphics subsystem 915 may be integrated into processor 910 or chipset 905. In some implementations, graphics subsystem 915 may be a stand-alone device communicatively coupled to chipset 905.

The graphics and/or video processing techniques described herein may be implemented in various hardware architectures. For example, graphics and/or video functionality may be integrated within a chipset. Alternatively, a discrete graphics and/or video processor may be used. As still another implementation, the graphics and/or video functions may be provided by a general purpose processor, including a multi-core processor. In a further implementations, the functions may be implemented in a consumer electronics device.

Radio 918 may include one or more radios capable of transmitting and receiving signals using various suitable wireless communications techniques. Such techniques may involve communications across one or more wireless networks. Example wireless networks include (but are not limited to) wireless local area networks (WLANs), wireless personal area networks (WPANs), wireless metropolitan area network (WMANs), cellular networks, and satellite networks. In communicating across such networks, radio 918 may operate in accordance with one or more applicable standards in any version.

In various implementations, display 920 may include any television type monitor or display. Display 920 may include, for example, a computer display screen, touch screen display, video monitor, television-like device, and/or a television. Display 920 may be digital and/or analog. In various implementations, display 920 may be a holographic display. Also, display 920 may be a transparent surface that may receive a visual projection. Such projections may convey various forms of information, images, and/or objects. For example, such projections may be a visual overlay for a mobile augmented reality (MAR) application. Under the control of one or more software applications 916, platform 902 may display user interface 922 on display 920.

In various implementations, content services device(s) 930 may be hosted by any national, international and/or independent service and thus accessible to platform 902 via the Internet, for example. Content services device(s) 930 may be coupled to platform 902 and/or to display 920.

Platform 902 and/or content services device(s) 930 may be coupled to a network 960 to communicate (e.g., send and/or receive) media information to and from network 960. Content delivery device(s) 940 also may be coupled to platform 902 and/or to display 920.

In various implementations, content services device(s) 930 may include a cable television box, personal computer, network, telephone, Internet enabled devices or appliance capable of delivering digital information and/or content, and any other similar device capable of unidirectionally or bidirectionally communicating content between content providers and platform 902 and/display 920, via network 960 or directly. It will be appreciated that the content may be communicated unidirectionally and/or bidirectionally to and from any one of the components in system 900 and a content provider via network 960. Examples of content may include any media information including, for example, video, music, medical and gaming information, and so forth.

Content services device(s) 930 may receive content such as cable television programming including media information, digital information, and/or other content. Examples of content providers may include any cable or satellite television or radio or Internet content providers. The provided examples are not meant to limit implementations in accordance with the present disclosure in any way.

In various implementations, platform 902 may receive control signals from navigation controller 950 having one or more navigation features. The navigation features of controller 950 may be used to interact with user interface 922, for example. In various implementations, navigation controller 950 may be a pointing device that may be a computer hardware component (specifically, a human interface device) that allows a user to input spatial (e.g., continuous and multi-dimensional) data into a computer. Many systems such as graphical user interfaces (GUI), and televisions and monitors allow the user to control and provide data to the computer or television using physical gestures.

Movements of the navigation features of controller 950 may be replicated on a display (e.g., display 920) by movements of a pointer, cursor, focus ring, or other visual indicators displayed on the display. For example, under the control of software applications 916, the navigation features located on navigation controller 950 may be mapped to virtual navigation features displayed on user interface 922, for example. In various implementations, controller 950 may not be a separate component but may be integrated into platform 902 and/or display 920. The present disclosure, however, is not limited to the elements or in the context shown or described herein.

In various implementations, drivers (not shown) may include technology to enable users to instantly turn on and off platform 902 like a television with the touch of a button after initial boot-up, when enabled, for example. Program logic may allow platform 902 to stream content to media adaptors or other content services device(s) 930 or content delivery device(s) 940 even when the platform is turned "off." In addition, chipset 905 may include hardware and/or software support for 5.1 surround sound audio and/or high definition 7.1 surround sound audio, for example. Drivers may include a graphics driver for integrated graphics platforms. In various implementations, the graphics driver may comprise a peripheral component interconnect (PCI) Express graphics card.

In various implementations, any one or more of the components shown in system 900 may be integrated. For example, platform 902 and content services device(s) 930 may be integrated, or platform 902 and content delivery device(s) 940 may be integrated, or platform 902, content services device(s) 930, and content delivery device(s) 940 may be integrated, for example. In various implementations, platform 902 and display 920 may be an integrated unit. Display 920 and content service device(s) 930 may be integrated, or display 920 and content delivery device(s) 940 may be integrated, for example. These examples are not meant to limit the present disclosure.

In various implementations, system 900 may be implemented as a wireless system, a wired system, or a combination of both. When implemented as a wireless system, system 900 may include components and interfaces suitable for communicating over a wireless shared media, such as one or more antennas, transmitters, receivers, transceivers, amplifiers, filters, control logic, and so forth. An example of wireless shared media may include portions of a wireless spectrum, such as the RF spectrum and so forth. When implemented as a wired system, system 900 may include components and interfaces suitable for communicating over wired communications media, such as input/output (I/O) adapters, physical connectors to connect the I/O adapter with a corresponding wired communications medium, a network interface card (NIC), disc controller, video controller, audio controller, and the like. Examples of wired communications media may include a wire, cable, metal leads, printed circuit board (PCB), backplane, switch fabric, semiconductor material, twisted-pair wire, co-axial cable, fiber optics, and so forth.

Platform 902 may establish one or more logical or physical channels to communicate information. The information may include media information and control information. Media information may refer to any data representing content meant for a user. Examples of content may include, for example, data from a voice conversation, videoconference, streaming video, electronic mail ("email") message, voice mail message, alphanumeric symbols, graphics, image, video, text and so forth. Data from a voice conversation may be, for example, speech information, silence periods, background noise, comfort noise, tones and so forth. Control information may refer to any data representing commands, instructions or control words meant for an automated system. For example, control information may be used to route media information through a system, or instruct a node to process the media information in a predetermined manner. The implementations, however, are not limited to the elements or in the context shown or described in FIG. 9.

Figure 10:
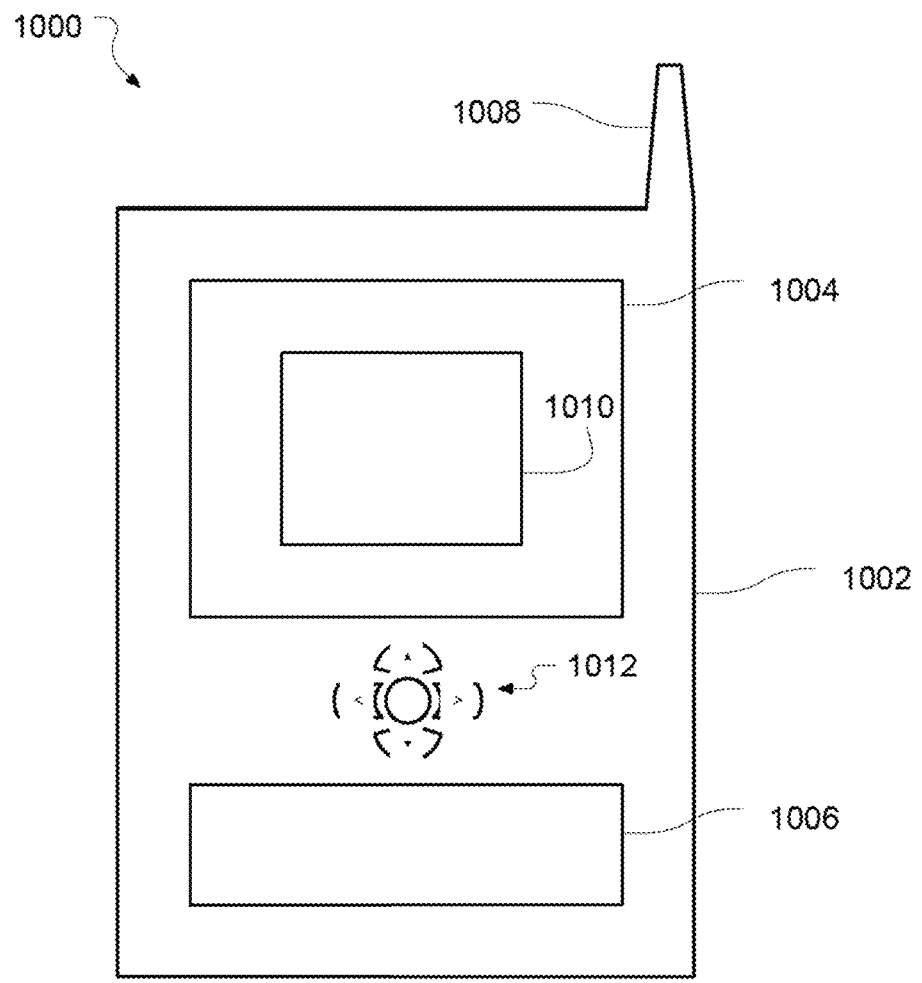
FIG. 10 illustrates an example device, all arranged in accordance with at least some implementations of the present disclosure.

As described above, system 200 may be embodied in varying physical styles or form factors. FIG. 10 illustrates implementations of a small form factor device 1000 in which system 200 may be embodied. In various implementations, for example, device 1000 may be implemented as a mobile computing device having wireless capabilities. A mobile computing device may refer to any device having a processing system and a mobile power source or supply, such as one or more batteries, for example.

As described above, examples of a mobile computing device may include a personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, cameras (e.g. point-and-shoot cameras, super-zoom cameras, digital single-lens reflex (DSLR) cameras), and so forth.

Examples of a mobile computing device also may include computers that are arranged to be worn by a person, such as a wrist computer, finger computer, ring computer, eyeglass computer, belt-clip computer, arm-band computer, shoe computers, clothing computers, and other wearable computers. In various implementations, for example, a mobile computing device may be implemented as a smart phone capable of executing computer applications, as well as voice communications and/or data communications. Although some implementations may be described with a mobile computing device implemented as a smart phone by way of example, it may be appreciated that other implementations may be implemented using other wireless mobile computing devices as well. The implementations are not limited in this context.

As shown in FIG. 10, device 1000 may include a housing 1002, a display 1004, an input/output (I/O) device 1006, and an antenna 1008. Device 1000 also may include navigation features 1012. Display 1004 may include any suitable display unit for displaying information appropriate for a mobile computing device. I/O device 1006 may include any suitable I/O device for entering information into a mobile computing device. Examples for I/O device 1006 may include an alphanumeric keyboard, a numeric keypad, a touch pad, input keys, buttons, switches, rocker switches, microphones, speakers, voice recognition device and software, and so forth. Information also may be entered into device 1000 by way of microphone (not shown). Such information may be digitized by a voice recognition device (not shown). The implementations are not limited in this context.

Various implementations may be implemented using hardware elements, software elements, or a combination of both. Examples of hardware elements may include processors, microprocessors, circuits, circuit elements (e.g. transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an implementation is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

One or more aspects of at least one implementation may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor.

While certain features set forth herein have been described with reference to various implementations, this description is not intended to be construed in a limiting sense. Hence, various modifications of the implementations described herein, as well as other implementations, which are apparent to persons skilled in the art to which the present disclosure pertains are deemed to lie within the spirit and scope of the present disclosure.

The following examples pertain to further implementations.

By one approach, a computer-implemented method comprises intra-coding of at least one coding unit of at least one depth map and associated with a plurality of pixels, and comprising depending, at least in part, on the size of the coding unit, at least one of:
 (a) eliminating the option to perform simplified depth coding (SDC) to code the coding unit;
 (b) removing the option to perform depth modeling mode (DMM) coding while permitting the use of other simplified depth coding modes to code the coding unit; and
 (c) dividing the coding unit into a plurality of prediction units to be coded so that the coding is not limited to less than all of the specific simplified depth coding modes available from the intra-coding and due to the coding unit being too large.

In other variations, the method may comprise intra-coding depending, at least in part, on whether the coding unit has a size of 64×64 pixels, and wherein removing includes providing a choice among intra_DC, intra_planar, and intra_DMM coding modes when the size of the coding unit is smaller than a specified size, and providing a choice between intra_DC and intra_planar coding modes and not intra_DMM coding mode when the coding unit is the specified size. The method may also comprise determining the size of the coding unit, when the coding unit is 64×64 pixels, providing simplified depth coding mode options intra_DC and intra_planar and not intra_DMM, and when the coding unit is less than 64×64 pixels, providing at least simplified depth coding mode options intra_DC, intra_planar, and intra_DMM. Otherwise, the method may include wherein the removing comprises using a single bit to indicate the simplified depth coding mode for a coding unit with a size of 64×64 pixels, wherein the eliminating includes performing simplified depth coding for coding units smaller than 64×64 pixels, and/or wherein the eliminating comprises transmitting an SDC flag when the size of the coding unit is less than 64×64 pixels but not transmitting the SDC flag when the coding unit is 64×64 pixels. The dividing may comprise dividing the coding unit into 32×32 pixel prediction units, and the dividing may include dividing the coding unit no matter which simplified depth coding (SDC) mode among intra_DC, intra_planar, and intra_DMM coding modes is to be used.

By another example, a system for intra-coding depth maps may comprise a display, a memory communicatively coupled to the display, at least one processor core communicatively coupled to the memory and the display, and an intra-prediction module communicatively coupled to the at least one processor core. The module may be configured to intra-code at least one coding unit of at least one depth map and associated with a plurality of pixels, and comprising depending, at least in part, on the size of the coding unit, at least one of:

eliminating the option to perform simplified depth coding (SDC) to code the coding unit; removing the option to perform depth modeling mode (DMM) coding while permitting the use of other simplified depth coding modes to code the coding unit; and dividing the coding unit into a plurality of prediction units to be coded so that the coding is not limited to less than all of the specific simplified depth coding modes available from the intra-coding and due to the coding unit being too large.

By other examples, the intra-coding module may be configured to intra-code the coding unit depending, at least in part, on whether the coding unit has a size of 64×64 pixels, and wherein the intra-coding module is configured to intra-code the coding unit by providing a choice among intra_DC, intra_planar, and intra_DMM coding modes when the size of the coding unit is smaller than a specified size, and providing a choice between intra_DC and intra_planar coding modes and not intra_DMM coding mode when the coding unit is the specified size. The intra-coding module may be configured to intra-code the coding unit by determining the size of the coding unit, when the coding unit is 64×64 pixels, providing simplified depth coding mode options intra_DC and intra_planar and not intra_DMM, and when the coding unit is less than 64×64 pixels, providing at least simplified depth coding mode options intra_DC, intra_planar, and intra_DMM. Otherwise, the intra-coding module may be configured to intra-code the coding unit by using a single bit to indicate the simplified depth coding mode for a coding unit with a size of 64×64 pixels. The intra-coding module may be configured to intra-code the coding unit by performing simplified depth coding for coding units smaller than 64×64 pixels, and/or may be configured to intra-code the coding unit by transmitting an SDC flag when the size of the coding unit is less than 64×64 pixels but not transmitting the SDC flag when the coding unit is 64×64 pixel. The intra-coding module also may be configured to intra-code the coding unit by dividing the coding unit into 32×32 pixel prediction units. The intra-coding module may be configured to intra-code the coding unit by dividing the coding unit no matter which simplified depth coding (SDC) mode among intra_DC, intra_planar, and intra_DMM coding modes is to be used.

By another approach, an article having a non-transitory computer readable medium with instructions thereon, that when executed, cause a computer to intra-code at least one coding unit of at least one depth map and associated with a plurality of pixels, and comprising depending, at least in part, on the size of the coding unit, at least one of:

eliminating the option to perform simplified depth coding (SDC) to code the coding unit; removing the option to perform depth modeling mode (DMM) coding while permitting the use of other simplified depth coding modes to code the coding unit; and dividing the coding unit into a plurality of prediction units to be coded so that the coding is not limited to less than all of the specific simplified depth coding modes available from the intra-coding and due to the coding unit being too large.

By other approaches, the instructions may cause the computer to intra-code depending at least in part, on whether the coding unit has a size of 64×64 pixels, and wherein removing includes providing a choice among intra_DC, intra_planar, and intra_DMM coding modes when the size of the coding unit is smaller than a specified size, and providing a choice between intra_DC and intra_planar coding modes and not intra_DMM coding mode when the coding unit is the specified size. The instructions also may cause the computer to determine the size of the coding unit, when the coding unit is 64×64 pixels, provide simplified depth coding mode options intra_DC and intra_planar and not intra_DMM, and when the coding unit is less than 64×64 pixels, provide at least simplified depth coding mode options intra_DC, intra_planar, and intra_DMM. Otherwise, the instructions may include wherein removing comprises using a single bit to indicate the simplified depth coding mode for a coding unit with a size of 64×64 pixels, wherein the eliminating includes performing simplified depth coding for coding units smaller than 64×64 pixels, and/or wherein the eliminating comprises transmitting an SDC flag when the size of the coding unit is less than 64×64 pixels but not transmitting the SDC flag when the coding unit is 64×64 pixels. The dividing may comprise dividing the coding unit into 32×32 pixel prediction units, and the dividing may include dividing the coding unit no matter which simplified depth coding (SDC) mode among intra_DC, intra_planar, and intra_DMM coding modes is to be used.

In a further example, at least one machine readable medium may include a plurality of instructions that in response to being executed on a computing device, causes the computing device to perform the method according to any one of the above examples.

In a still further example, an apparatus may include means for performing the methods according to any one of the above examples.

The above examples may include specific combination of features. However, the above examples are not limited in this regard and, in various implementations, the above examples may include undertaking only a subset of such features, undertaking a different order of such features, undertaking a different combination of such features, and/or undertaking additional features than those features explicitly listed. For example, all features described with respect to any example methods herein may be implemented with respect to any example apparatus, example systems, and/or example articles, and vice versa.

What is claimed:

1. A computer-implemented method comprising:
intra-coding of at least one coding unit of at least one depth map and associated with a plurality of pixels, and comprising providing the option to select at least one among three available ways to perform the intra-coding each depending, at least in part, on the size of the coding unit, the three available ways comprise:
eliminating the option to perform simplified depth coding (SDC) to code the coding unit;
removing the option to perform depth modeling mode (DMM) coding while permitting the use of other simplified depth coding modes to code the coding unit; and
dividing the coding unit into a plurality of prediction units to be coded so that the coding is not limited to less than all of the specific simplified depth coding modes available from the intra-coding and due to the coding unit being too large.

2. The method of claim 1, comprising intra-coding depending, at least in part, on whether the coding unit has a size of 64×64 pixels.

3. The method of claim 1 wherein the removing includes providing a choice among intra_DC, intra_planar, and intra_DMM coding modes when the size of the coding unit is smaller than a specified size, and providing a choice between intra_DC and intra_planar coding modes and not intra_DMM coding mode when the coding unit is the specified size.

4. The method of claim 1 comprising:
determining the size of the coding unit;
when the coding unit is 64×64 pixels, providing simplified depth coding mode options intra_DC and intra_planar and not intra_DMM; and
when the coding unit is less than 64×64 pixels, providing at least simplified depth coding mode options intra_DC, intra_planar, and intra_DMM.

5. The method of claim 1 wherein removing comprises using a single bit to indicate the simplified depth coding mode for a coding unit with a size of 64×64 pixels.

6. The method of claim 1 wherein the eliminating includes performing simplified depth coding for coding units smaller than 64×64 pixels.

7. The method of claim 1 wherein the eliminating comprises transmitting an SDC flag when the size of the coding unit is less than 64×64 pixels but not transmitting the SDC flag when the coding unit is 64×64 pixels.

8. The method of claim 1 wherein dividing comprises dividing the coding unit into 32×32 pixel prediction units.

9. The method of claim 1 wherein dividing includes dividing the coding unit no matter which simplified depth coding (SDC) mode among intra_DC, intra_planar, and intra_DMM coding modes is to be used.

10. The method of claim 1 comprising intra-coding depending at least in part, on whether the coding unit has a size of 64×64 pixels;
wherein the removing includes providing a choice among intra_DC, intra_planar, and intra_DMM coding modes when the size of the coding unit is smaller than a specified size, and providing a choice between intra_DC and intra_planar coding modes and not intra_DMM coding mode when the coding unit is the specified size;
determining the size of the coding unit,
when the coding unit is 64×64 pixels, providing simplified depth coding mode options intra_DC and intra_planar and not intra_DMM, and
when the coding unit is less than 64×64 pixels, providing at least simplified depth coding mode options intra_DC, intra_planar, and intra_DMM;
wherein removing comprises using a single bit to indicate the simplified depth coding mode for a coding unit with a size of 64×64 pixels;
wherein the eliminating includes performing simplified depth coding for coding units smaller than 64×64 pixels;
wherein the eliminating comprises transmitting an SDC flag when the size of the coding unit is less than 64×64 pixels but not transmitting the SDC flag when the coding unit is 64×64 pixels;
wherein dividing comprises dividing the coding unit into 32×32 pixel prediction units; and
wherein dividing includes dividing the coding unit no matter which simplified depth coding (SDC) mode among intra_DC, intra_planar, and intra_DMM coding modes is to be used.

11. A system for intra-coding depth maps comprising: a display; a memory communicatively coupled to the display; at least one processor core communicatively coupled to the memory and the display; and
an intra-prediction module communicatively coupled to the at least one processor core and configured to:
intra-code at least one coding unit of at least one depth map and associated with a plurality of pixels, and comprising providing the option to select at least one among three available ways to perform the intra-coding each depending, at least in part, on the size of the coding unit, the three available ways comprise:
eliminating the option to perform simplified depth coding (SDC) to code the coding unit;
removing the option to perform depth modeling mode (DMM) coding while permitting the use of other simplified depth coding modes to code the coding unit; and
dividing the coding unit into a plurality of prediction units to be coded so that the coding is not limited to less than all of the specific simplified depth coding modes available from the intra-coding and due to the coding unit being too large.

12. The system of claim 11, wherein the intra-coding module is configured to intra-code the coding unit depending, at least in part, on whether the coding unit has a size of 64×64 pixels.

13. The system of claim 11 wherein the intra-coding module is configured to intra-code the coding unit by providing a choice among intra_DC, intra_planar, and intra_DMM coding modes when the size of the coding unit is smaller than a specified size, and providing a choice between intra_DC and intra_planar coding modes and not intra_DMM coding mode when the coding unit is the specified size.

14. The system of claim 11 wherein the intra-coding module is configured to intra-code the coding unit by:
determining the size of the coding unit;
when the coding unit is 64×64 pixels, providing simplified depth coding mode options intra_DC and intra_planar and not intra_DMM; and
when the coding unit is less than 64×64 pixels, providing at least simplified depth coding mode options intra_DC, intra_planar, and intra_DMM.

15. The system of claim 11 wherein the intra-coding module is configured to intra-code the coding unit by using a single bit to indicate the simplified depth coding mode for a coding unit with a size of 64×64 pixels.

16. The system of claim 11 wherein the intra-coding module is configured to intra-code the coding unit by performing simplified depth coding for coding units smaller than 64×64 pixels.

17. The system of claim 11 wherein the intra-coding module is configured to intra-code the coding unit by one of:
transmitting an SDC flag when the size of the coding unit is less than 64×64 pixels but not transmitting the SDC flag when the coding unit is 64×64 pixels, and
intra-code the coding unit by dividing the coding unit no matter which simplified depth coding (SDC) mode among intra_DC, intra_planar, and intra_DMM coding modes is to be used.

18. The system of claim 11 wherein the intra-coding module is configured to intra-code the coding unit depending, at least in part, on whether the coding unit has a size of 64×64 pixels;
wherein the intra-coding module is configured to intra-code the coding unit by providing a choice among intra_DC, intra_planar, and intra_DMM coding modes when the size of the coding unit is smaller than a specified size, and providing a choice between intra_DC and intra_planar coding modes and not intra_DMM coding mode when the coding unit is the specified size;

wherein the intra-coding module is configured to intra-code the coding unit by:
determining the size of the coding unit,
when the coding unit is 64×64 pixels, providing simplified depth coding mode options intra_DC and intra_planar and not intra_DMM, and
when the coding unit is less than 64×64 pixels, providing at least simplified depth coding mode options intra_DC, intra_planar, and intra_DMM;
wherein the intra-coding module is configured to intra-code the coding unit by using a single bit to indicate the simplified depth coding mode for a coding unit with a size of 64×64 pixels;
wherein the intra-coding module is configured to intra-code the coding unit by performing simplified depth coding for coding units smaller than 64×64 pixels;
wherein the intra-coding module is configured to intra-code the coding unit by transmitting an SDC flag when the size of the coding unit is less than 64×64 pixels but not transmitting the SDC flag when the coding unit is 64×64 pixels;
wherein the intra-coding module is configured to intra-code the coding unit by dividing the coding unit into 32×32 pixel prediction units; and
wherein the intra-coding module is configured to intra-code the coding unit by dividing the coding unit no matter which simplified depth coding (SDC) mode among intra_DC, intra_planar, and intra_DMM coding modes is to be used.

19. An article having a non-transitory computer readable medium with instructions thereon, that when executed, cause a computer to:
intra-code at least one coding unit of at least one depth map and associated with a plurality of pixels, and comprising providing the option to select at least one among three available ways to perform the intra-coding each depending, at least in part, on the size of the coding unit, the three available ways comprise:
eliminating the option to perform simplified depth coding (SDC) to code the coding unit;
removing the option to perform depth modeling mode (DMM) coding while permitting the use of other simplified depth coding modes to code the coding unit; and
dividing the coding unit into a plurality of prediction units to be coded so that the coding is not limited to less than all of the specific simplified depth coding modes available from the intra-coding and due to the coding unit being too large.

20. The article of claim 19 wherein the instructions cause the computer to:
intra-code depending at least in part, on whether the coding unit has a size of 64×64 pixels; and
wherein the removing includes providing a choice among intra_DC, intra_planar, and intra_DMM coding modes when the size of the coding unit is smaller than a specified size, and providing a choice between intra_DC and intra_planar coding modes and not intra_DMM coding mode when the coding unit is the specified size;
wherein the instructions cause the computer to:
determine the size of the coding unit,
when the coding unit is 64×64 pixels, provide simplified depth coding mode options intra_DC and intra_planar and not intra_DMM, and
when the coding unit is less than 64×64 pixels, provide at least simplified depth coding mode options intra_DC, intra_planar, and intra_DMM;
wherein removing comprises using a single bit to indicate the simplified depth coding mode for a coding unit with a size of 64×64 pixels;
wherein the eliminating includes performing simplified depth coding for coding units smaller than 64×64 pixels;
wherein the eliminating comprises transmitting an SDC flag when the size of the coding unit is less than 64×64 pixels but not transmitting the SDC flag when the coding unit is 64×64 pixels;
wherein dividing comprises dividing the coding unit into 32×32 pixel prediction units; and
wherein dividing includes dividing the coding unit no matter which simplified depth coding (SDC) mode among intra_DC, intra_planar, and intra_DMM coding modes is to be used.

\* \* \* \* \*